(12) United States Patent
Harlamert, II

(10) Patent No.: US 12,107,931 B2
(45) Date of Patent: *Oct. 1, 2024

(54) SYSTEM AND METHOD FOR IDENTIFYING AND TAGGING USERS

(71) Applicant: Polaris Solutions, LLC, New York, NY (US)

(72) Inventor: John Phillip Harlamert, II, Mount Washington, KY (US)

(73) Assignee: Polaris Solutions, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/354,113

(22) Filed: Jun. 22, 2021

(65) Prior Publication Data
US 2021/0314412 A1 Oct. 7, 2021

Related U.S. Application Data

(63) Continuation of application No. 15/619,242, filed on Jun. 9, 2017, now Pat. No. 11,076,005.

(51) Int. Cl.
*H04L 67/50* (2022.01)
*G06F 16/245* (2019.01)
(Continued)

(52) U.S. Cl.
CPC .......... *H04L 67/535* (2022.05); *G06F 16/245* (2019.01); *G06F 16/9535* (2019.01);
(Continued)

(58) Field of Classification Search
None
See application file for complete search history.

(56) References Cited

U.S. PATENT DOCUMENTS

| 6,073,241 A | * | 6/2000 | Rosenberg | .............. H04L 29/06 726/3 |
| 6,671,424 B1 | | 12/2003 | Skoll et al. | |

(Continued)

FOREIGN PATENT DOCUMENTS

| WO | WO 2005052755 | 6/2005 |
| WO | 2018226244 A1 | 12/2018 |

OTHER PUBLICATIONS

European Communication Pursuant to Rules 70(2) and 70a(2) EPC and Supplementary European Search Report issued on Dec. 22, 2020 in related European Patent Application No. 17912602.4; 10 pages.

(Continued)

*Primary Examiner* — Tonia L Dollinger
*Assistant Examiner* — Ishrat Rashid
(74) *Attorney, Agent, or Firm* — Fish & Richardson P.C.

(57) ABSTRACT

The present disclosure relates to a system, method, and computer-program product for identifying and tagging users. Embodiments may include receiving, using at least one processor, a first content request. Embodiments may further include associating a user-access identifier with a first portion of data from the first content request based upon a second portion of the data from the first content request. Embodiments may also include storing the first portion of data from the first content request and the user-access identifier within a memory system. Embodiments may further include receiving a second content request. Embodiments may also include generating a user-identifier tag based upon the user-access identifier stored in the memory system, the first portion of data from the first content request, and a first portion of data from the second content request. Embodiments may further include providing a response to (Continued)

the second content request, the response including the user-identifier tag.

21 Claims, 12 Drawing Sheets

(51) Int. Cl.
| | |
|---|---|
| *G06F 16/9535* | (2019.01) |
| *G06Q 30/0241* | (2023.01) |
| *G06Q 30/0251* | (2023.01) |
| *H04L 51/10* | (2022.01) |
| *H04L 51/18* | (2022.01) |
| *H04L 51/42* | (2022.01) |
| *H04L 67/02* | (2022.01) |
| *H04L 67/306* | (2022.01) |

(52) U.S. Cl.
CPC ..... *G06Q 30/0269* (2013.01); *G06Q 30/0277* (2013.01); *H04L 51/18* (2013.01); *H04L 67/306* (2013.01); *H04L 51/10* (2013.01); *H04L 51/42* (2022.05); *H04L 67/02* (2013.01)

(56) References Cited

U.S. PATENT DOCUMENTS

| | | | |
|---|---|---|---|
| 6,973,195 B1 | 12/2005 | Matsui | |
| 6,975,733 B1 | 12/2005 | Choi et al. | |
| 7,092,992 B1 | 8/2006 | Yu | |
| 7,123,741 B2 | 10/2006 | Ono | |
| 7,979,912 B1 | 7/2011 | Roka | |
| 8,946,610 B2 | 2/2015 | Iwabuchi et al. | |
| 8,990,359 B1 | 3/2015 | Ravi | |
| 10,698,947 B2 | 6/2020 | Harlamert et al. | |
| 11,076,005 B2 | 7/2021 | Harlamert | |
| 2005/0114510 A1 | 5/2005 | Error et al. | |
| 2006/0047571 A1* | 3/2006 | Garcia | G06Q 30/0267 705/14.64 |
| 2006/0200425 A1* | 9/2006 | Steele | G06Q 20/382 705/64 |
| 2007/0112676 A1* | 5/2007 | Kontio | H04L 63/12 705/50 |
| 2007/0124480 A1 | 5/2007 | Heled et al. | |
| 2009/0019148 A1 | 1/2009 | Britton et al. | |
| 2009/0171760 A1 | 7/2009 | Aarnio | |
| 2010/0023550 A1* | 1/2010 | Erhard | G09B 5/00 707/E17.005 |
| 2012/0035994 A1* | 2/2012 | Fernandez | H04N 21/812 705/14.4 |
| 2013/0166762 A1* | 6/2013 | Jalan | H04L 61/00 709/228 |
| 2013/0246609 A1* | 9/2013 | Topchy | G06F 16/957 709/224 |
| 2014/0041008 A1 | 2/2014 | Roskind | |
| 2014/0143337 A1 | 5/2014 | McIntosh et al. | |
| 2014/0214919 A1* | 7/2014 | Taylor | H04L 67/563 709/203 |
| 2014/0278749 A1 | 9/2014 | Trenkle et al. | |
| 2015/0135253 A1 | 5/2015 | Angel | |
| 2015/0188897 A1 | 7/2015 | Grigorovici et al. | |
| 2015/0334158 A1 | 11/2015 | Ravi | |
| 2016/0148255 A1 | 5/2016 | Shariat et al. | |
| 2017/0046734 A1* | 2/2017 | Chittilappilly | G06Q 30/0246 |
| 2017/0068690 A1* | 3/2017 | Harlamert | H04L 67/535 |
| 2017/0323158 A1 | 11/2017 | Gordon | |
| 2018/0359324 A1 | 12/2018 | Harlamert | |

OTHER PUBLICATIONS

International Search Report Issued on Aug. 29, 2017 in Application Serial No. PCT/US2017/036851.
European Communication Pursuant to Rules 70(2) and 70a(2) EPC and Extended Supplementary European Search Report issued on Dec. 4, 2020 in related European Patent Application No. 17912602.4; 9 pages.
Askleo.com [online], "Supercookies and Evercookies: Resistance is Futile," available on Oct. 5, 2014, via Internet Archive: Wayback Machine URL <https://web.archive.org/web/20141005063739/https://askleo.com/supercookies_and_evercookies/>, retrieved on Jun. 27, 2022, URL <https://askleo.com/supercookies_and_evercookies/>.
Extended European Search Report in European Appln No. 16842570.0 dated Mar. 19, 2019, 7 pages.
Hoffman, C. "The Many Ways Websites Track You Online"; How-to-Geek; Article [online]; dated Jun. 1, 2012; 6 pages.
International Preliminary Report on Patentability in International Appln. No. PCT/US2016/047553, dated Mar. 15, 2018, 7 pages.
International Search Report and Written Opinion in International Appln. No. PCT/US2016/047553, dated Nov. 4, 2016, 8 pages.
International Search Report and Written Opinion in International Appln. No. PCT/US2017/036851 dated Aug. 29, 2017, 9 pages.
Paries' Foundation Silverlight 2 Animation, 1st edition, Jan. 2003, Chapter 3, 1 page.
Blog.httpwatch.com [online], "Image Caching in Internet Explorer," Feb. 27, 2008, retrieved on Jun. 2, 2023, retrieved from URL<https://blog.httpwatch.com/2008/02/27/image-caching-in-internet-explorer/>, 8 pages.
HowToGeek.com [online], "Learn How Websites Are Tracking You Online," available on or before Jun. 4, 2012, via Internet Archive: Wayback Machine URL <https:/tweb.archive.orgtweb/20120604020351/https://www.howtogeek.com/115483/htg-exlpains-learn-how-websites-are-tracking-you-online?>, 5 pages.
Wikipedia.org [online], "Alpha compositing," available on or before Feb. 3, 2012, via Internet Archive: Wayback Machine URL<https://web.archive.org/web/20120203211818/http://en.wikipedia.org/wiki/Alpha_channel>, 5 pages.
Wikipedia.org [online], "Transparency (graphic)," available on or before Feb. 17, 2012, via Internet Archive: Wayback Machine URL <https://web.archive.org/web/20120217053628/http://en.wikipedia.org/>, 6 pages.
Wikipedia.org [online], "Web bug," available on or before Nov. 13, 2012, via Internet Archive: Wayback Machine URL <https://web.archive.org/web/20121113184350/https://en.wikipedia.org/wiki/Web_beacon>, 5 pages.

* cited by examiner

SYSTEM AND METHOD FOR IDENTIFYING AND TAGGING USERS

RELATED APPLICATIONS

The subject application is a continuation application of U.S. patent application with Ser. No. 15/619,242, filed Jun. 9, 2017, entitled "System and Method or Identifying and Tagging Users" the entire contents of which are herein incorporated by reference.

FIELD OF THE INVENTION

The present disclosure relates to identifying and tagging users, and more specifically, to a system and method for identifying and tagging users with a user-identifier tag.

DISCUSSION OF THE RELATED ART

Tracking of users on the Internet is an important component of web analytics. Customer tracking can help a business determine whether certain advertisements or marketing campaigns effectively target the customer to the business' website or application. For example, companies can send email advertisements to users and later track whether those users purchased the products advertised in the emails. The company can then carefully tailor their marketing campaign, content and budget towards those activities that generate the most valuable customer engagement.

Tracking of users begins with identifying and tagging users. An email beacon (or a "web bug") is one manner of tracking an online user. The beacon is typically an object embedded in a web page or email that can be checked to determine whether the user has accessed content. For example, a beacon can be included within an email and, when the email is opened, the beacon can make a request back to a server. By sending this request, the server knows the identified user opened the email; or, in the world of web analytics, the company knows an existing or potential customer opened the email and viewed a marketing campaign in the email when the company receives notification from the server that a request was made. The beacon is typically a single-use identification and is unable to be stored within a browser cache. Beacons in emails are unable to execute client-server web actions and communications scripts which may reduce their effectiveness. Additional tracking methods, such as cookies, are blocked or filtered by most email software and have limited abilities in identifying a user.

Summary of Disclosure

In one or more embodiments of the present disclosure, a computer-implemented method for identifying and tagging users. The method may include receiving, using at least one processor, a first content request from a requesting computing device. The method may further include associating a user-access identifier from a database with a first portion of data from the first content request based upon, at least in part, a second portion of the data from the first content request. The method may also include storing the first portion of data from the first content request and the user-access identifier within a memory system. The method may further include receiving a second content request. The method may also include generating a user-identifier tag based upon, at least in part, the user-access identifier stored in the memory system, the first portion of data from the first content request, and a first portion of data from the second content request. The method may further include providing a response to the second content request, the response including the user-identifier tag.

One or more of the following features may be included. In some embodiments, the user-identifier tag may be generated based upon, at least in part, the user-access identifier when the first portion of data from the second content request matches the first portion of data stored in the memory system. The method may also include removing one or more of the first portion of data and the user-access identifier from within the memory system when one or more of a pre-defined period of time lapses from the storing of the first portion of data from the first content request and the user-access identifier within the memory system and when the first portion of data from the second content request matches the first portion of data stored in the memory system. In some embodiments, the user-access identifier may be associated with a user-specific identifier in the database.

The method may further include extracting the second portion of data from the first content request. The method may also include matching the second portion of data to a user-specific identifier in the database. The method may further include identifying the user-access identifier associated with the user-specific identifier from the database. The method may also include extracting the first portion of data from the first content request. The method may further include generating a first key to associate with the user-access identifier based upon, at least in part, the first portion of data extracted from the first content request. The method may also include storing the first key and the user-access identifier within the memory system.

The method may further include extracting the first portion of data from the second content request. The method may also include generating a second key based upon, at least in part, the first portion of data extracted from the second content request. In some embodiments, the user-identifier tag may be generated when the second key matches the first key stored within the memory system. In some embodiments, each of the first and second keys are an MD5 hash of the first portion of data extracted from each of the first and second content requests. The method may also include encoding the user-access identifier into a content item requested by the second content request and embedding the content item into the response to the second content request. In some embodiments, providing the response to the second content request may include sending the response to the second content request to a requesting computing device for storage. In some embodiments, the user-identifier tag generated for each second content request may include a generic tag identifier common to each user-identifier tag.

In some embodiments, the user-identified tag provided in the response to the second content request may include a directive configured to revalidate the user-identifier tag within storage of the requesting computing device. In some embodiments, the first and second content requests may be received in response to a user opening one or more of an email and a web page including the first and second content requests. In some embodiments, a user-specific identifier may be associated with each individual listed in a target list. In some embodiments, the first portion of data from each of the first and second content requests may include access-specific information. In some embodiments, the access-specific information may include one or more of an IP address of the requesting computing device, a User Agent string of a request header, and timing information. In some embodiments, one or more of the first and second content requests may include a request for one or more of a font, an image, a text file, a video file, or an audio file.

In one or more embodiments of the present disclosure, a computing system includes a processor and a memory module coupled with the processor. The processor may be configured for receiving a first content request from a requesting computing device. The processor may be further configured for associating a user-access identifier from a database with a first portion of data from the first content request based upon, at least in part, a second portion of the data from the first content request. The processor may be further configured for storing the first portion of data from the first content request and the user-access identifier within a memory system. The processor may be further configured for receiving a second content request. The processor may be further configured for generating a user-identifier tag based upon, at least in part, the user-access identifier stored in the memory system, the first portion of data from the first content request, and a first portion of data from the second content request. The processor may be further configured for providing a response to the second content request, the response including the user-identifier tag.

In one or more embodiments of the present disclosure, a computer program product includes a non-transitory computer readable storage medium having a plurality of instructions stored on it. When executed by a processor, the instructions may cause the processor to perform operations including receiving a first content request from a requesting computing device. Instructions may further be included for associating a user-access identifier from a database with a first portion of data from the first content request based upon, at least in part, a second portion of the data from the first content request. Instructions may further be included for storing the first portion of data from the first content request and the user-access identifier within a memory system. Instructions may further be included for receiving a second content request. Instructions may further be included for generating a user-identifier tag based upon, at least in part, the user-access identifier stored in the memory system, the first portion of data from the first content request, and a first portion of data from the second content request. Instructions may further be included for providing a response to the second content request, the response including the user-identifier tag.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
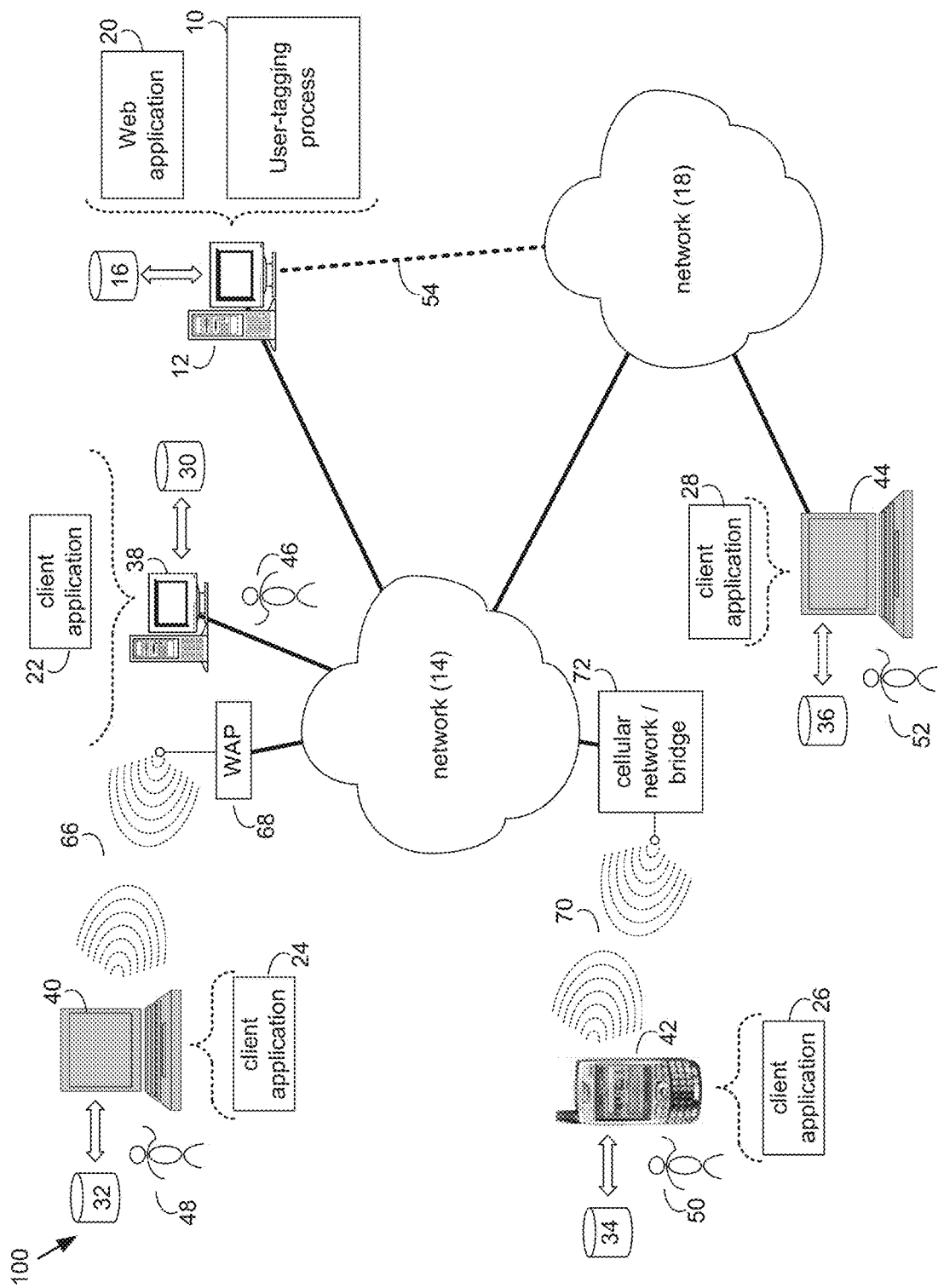
FIG. 1 is a diagram depicting an embodiment of a system in accordance with the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language, similar programming languages, or similar scripting languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown a user-tagging process 10 that may reside on and may be executed by computing device 12, which may be connected to network 14 (e.g., the Internet or a local area network). Examples of computing device 12 may include, but are not limited to: a personal computer, a server computer, a series of server computers, a mini computer, and a mainframe computer. Computing device 12 may be a web server (or a series of servers) running a network operating system, examples of which may include but are not limited to: Microsoft® Windows® Server; Novell® NetWare®; Unix®, or Red Hat®, Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, user-tagging process 10 may reside on and be executed, in whole or in part, by a client electronic device, such as a personal computer, notebook computer, personal digital assistant, or the like.

The instruction sets and subroutines of user-tagging process 10, which may include one or more software modules, and which may be stored on storage device 16 coupled to computing device 12, may be executed by one or more processors (not shown) and one or more memory modules (not shown) incorporated into computing device 12. Storage device 16 may include but is not limited to: a hard disk drive; a solid state drive, a tape drive; an optical drive; a RAID array; a random access memory (RAM); and a read-only memory (ROM).

Computing device 12 may execute a web server application and/or software, examples of which may include but are not limited to: Microsoft IIS, Novell Webserver™, or Apache® Webserver, that allows for HTTP (i.e., HyperText Transfer Protocol) access to computing device 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; a load balancer; or an intranet, for example.

Computing device 12 may execute a web browsing and/or electronic communication applications (e.g., web application 20). Web application 20 may interact with one or more web client applications (e.g., web client applications 22, 24, 26, 28) for electronic design optimization. In some embodiments, web application 20 may be client-side (e.g., web client applications 22, 24, 26, 28). In one example, web client applications 22, 24, 26, 28 may render HTML client-side. In another example, computing device 12 may store files and/or run execute a server-scripting language script or command to generate HTML or files dynamically which, in some embodiments, may be rendered at web client applications 22, 24, 26, 28. As will be discussed in greater detail below, examples of a server-scripting language include, but are not limited to, PHP: Hypertext Preprocessor (PHP), Server-side JavaScript®, ASP, Python, Ruby, SMX, etc.

User-tagging process 10 may be a stand-alone application, or may be an applet/application/script that may interact with and/or be executed within web application 20. In addition/as an alternative to being a server-side process, user-tagging process 10 may be a client-side process (not shown) that may reside on a client electronic device (described below) and may interact with a web client application (e.g., one or more of web client applications 22, 24, 26, 28). Further, user-tagging process 10 may be a hybrid server-side/client-side process that may interact with web application 20 and a web client application (e.g., one or more of client applications 22, 24, 26, 28). As such, user-tagging process 10 may reside, in whole, or in part, on computing device 12 and/or one or more client electronic devices.

The instruction sets and subroutines of web application 20, which may be stored on storage device 16 coupled to computing device 12 may be executed by one or more processors (not shown) and one or more memory modules (not shown) incorporated into computing device 12.

The instruction sets and subroutines of web client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access web application 20 and may allow users to e.g., utilize user-tagging process 10.

Users 46, 48, 50, 52 may access web application 20 directly through the device on which the client application (e.g., client applications 22, 24, 26, 28) is executed, namely client electronic devices 38, 40, 42, 44, for example. Users 46, 48, 50, 52 may access web application 20 directly through network 14 or through secondary network 18. Further, computing device 12 (i.e., the computer that executes web application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Figure 2:
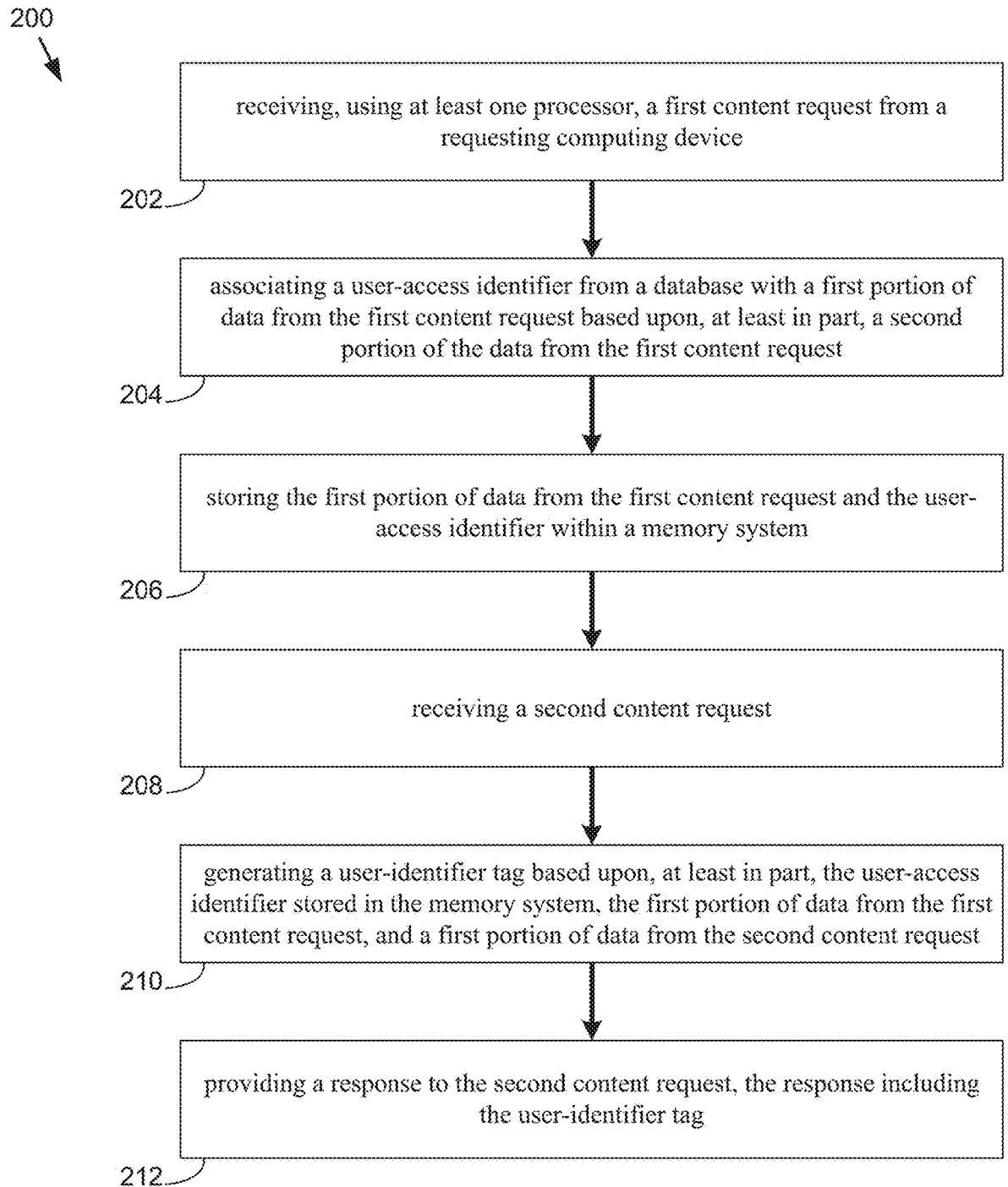
FIG. 2 is a flowchart depicting operations consistent with the user-tagging process in accordance with an embodiment of the present disclosure.

Referring now to FIG. 2, an exemplary flowchart 200 depicting operations consistent with user-tagging process 10 is provided. Embodiments may include receiving (202), using at least one processor, a first content request from a requesting computing device. Embodiments may further include associating (204) a user-access identifier from a database with a first portion of data from the first content request based upon, at least in part, a second portion of the data from the first content request. Embodiments may also include storing (206) the first portion of data from the first content request and the user-access identifier within a memory system. Embodiments may further include receiving (208) a second content request. Embodiments may also include generating (210) a user-identifier tag based upon, at least in part, the user-access identifier stored in the memory system, the first portion of data from the first content request, and a first portion of data from the second content request. Embodiments may further include providing (212) a response to the second content request, the response including the user-identifier tag.

Figure 3:
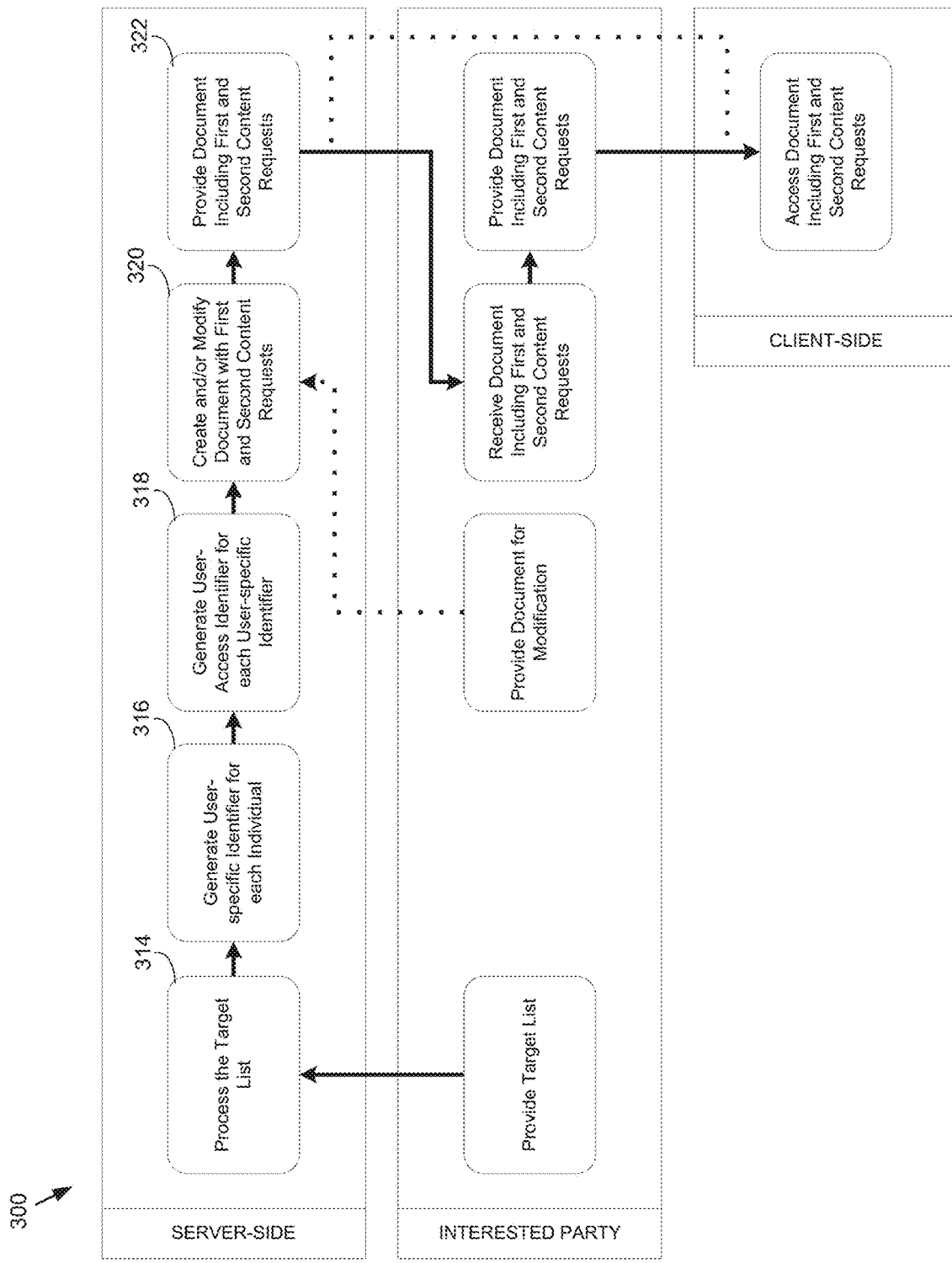
FIG. 3 is a diagram depicting an embodiment in accordance with the present disclosure.

As will be discussed in greater detail below, user-tagging process 10 may provide a user-identifier tag for tracking a user in response to a plurality of content requests made from a requesting computing device. For example, a user and/or a user of an organization may be interested in determining whether one or more individuals from a target list of individuals accesses a specific email, web page, and/or web application. Such a user and/or organization may be referred to hereafter as an "Interested Party." Referring now to the example of FIG. 3, user-tagging process 10 may receive a target list of one or more individuals. In one example, the target list may be received from the Interested Party. Examples of a target list may include, but are not limited to, email distribution lists, customer lists, contact lists, etc. In another example, the target list may be received at a server. In response to receiving the target list, user-tagging process 10 may process 314 each individual of the target list into one or more databases. Additionally and/or alternatively, user-tagging process 10 may process each individual into a list, a text file, a table, or any other method or mechanism for storing data in printed or electronic form. For example, throughout the present disclosure, reference may be made to "a database"; however, this is an example for illustration purposes and not a limitation of the present disclosure.

In some embodiments, user-tagging process 10 may generate an entry in the database for each individual of the target list. For each individual, user-tagging process 10 may include processing one or more of the name of the individual, the address of the individual, the contact information of the individual (e.g., email address(es), phone number(s), governmental id(s), social network contact information, etc.), a marketing or contact campaign associated with the individual, etc. in the database. In one example, each individual of the target list may include a list of health care providers and/or health care professionals. In this example, the Interested Party may be interested in determining whether one or more individuals (e.g., health care providers, health care professionals, etc.) from a target list of individuals accesses a specific email, web page, mobile application, and/or web application. In this example, user-tagging process 10 may include processing and storing a National Provider Identifier (NPI) associated with each health care provider in the database. While an example target list of health care providers has been discussed, this is for illustration purposes as any profession or group may be targeted.

As will be discussed in greater detail below, user-tagging process 10 may generate 316 a unique user-identifier for each individual in the target list. For example, each user-identifier may include a sequence of numbers, letters, symbols, combinations thereof, etc. specific to each individual listed in the database and/or target list. In some embodiments, the user-identifier may be an identifier different from the legal name of the individual. For example, if two individuals had the same legal name (e.g., "John Smith"), user-tagging process 10 may generate a unique user-specific identifier for each "John Smith", such that each user-specific identifier is specific to a person. In some embodiments, user-tagging process 10 may generate 318 a user-access identifier for each individual. For example, each user-access identifier may include a sequence of numbers, letters, symbols, combinations thereof, etc. In some embodiments, user-tagging process 10 may associate one or more user-access identifiers with each user-identifier or individual defined in the database.

In some embodiments, user-tagging process 10 may create and/or modify 320 a document including a first content request and a second content request. As will be discussed in greater detail below, user-tagging process 10 may provide a document that when opened, rendered, and/or executed by a target user, allows user-tagging process 10 to create a user-identifier tag for tracking the individual. The document, provided by user-tagging process 10, may include an email, a web page, mobile application, and/or other document capable of including a plurality of content requests that when rendered by a computing device, request content from another computing device, a domain, a server, a cloud-based storage location, a network, etc. for rendering content in the document. In some embodiments, user-tagging process 10 may embed or otherwise provide a plurality of content requests into the document. In one example, user-tagging process 10 may embed or otherwise provide a first content request and a second content request with the document. As will be discussed in greater detail below, the first content request may include a user-specific identifier. For example, first content request may include a request for a content item (e.g., an image, a video, a font, an audio file, a text file, etc.). User-tagging process 10 may embed the user-specific identifier into the first content request. In one example, user-tagging process 10 may embed the user-specific identifier into an image request such as an HTML image tag. As will be discussed in greater detail below, the second content request may include a request for a content item (e.g., an image, a video, a font, an audio file, a text file, etc.). User-tagging process 10 may embed a user-identifier tag into the response to the second content request. In one example, user-tagging process 10 may embed the user-identifier tag as an image or pixel.

In some embodiments, user-tagging process 10 may provide 322 the created and/or modified document including the first and second content requests to the Interested Party. In some embodiments, the Interested Party may receive the document including the first and second content requests and provide the document to the one or more targeted individuals. In one example, the Interested Party may provide the document including the first and second content requests to the one or more targeted individuals via an email, by publishing the document as a web page and providing a link to the one or more targeted individuals, etc.

In some embodiments, user-tagging process 10 may provide the document including the first and second content requests directly to the one or more targeted individuals. In one example, user-tagging process 10 may provide the document including the first and second content requests to the one or more targeted individuals via an email, by publishing the document as a web page and providing a link to the one or more targeted individuals, etc.

In one embodiment, user-tagging process 10 may receive a target list of individuals with email addresses as part of an email campaign. User-tagging process 10 may process the target list of individuals into the database and may generate a pre-defined user-identifier and/or user-access identifier for each individual. User-tagging process 10 may generate an email with a first content request and a second content request, which when rendered, cause a computing device to request content from another computing device, a domain, a server, a cloud-based storage location, a network, etc. for rendering in the email.

In another embodiment, user-tagging process 10 may receive a target list of individuals. User-tagging process 10 may process the target list of individuals into the database and may generate a user-identifier and/or user-access identifier for each individual. User-tagging process 10 may generate a web page with a first content request and a second content request, which when rendered, cause a computing device to request content from another computing device, a domain, a server, a cloud-based storage location, a network, etc. for rendering in the web page. In some embodiments, user-tagging process 10 may modify an existing web page received from the Interested Party by adding first content request and second content request to a web page. As will be discussed in greater detail below, the document provided by user-tagging process 10 may be an HTML document.

Figure 4:
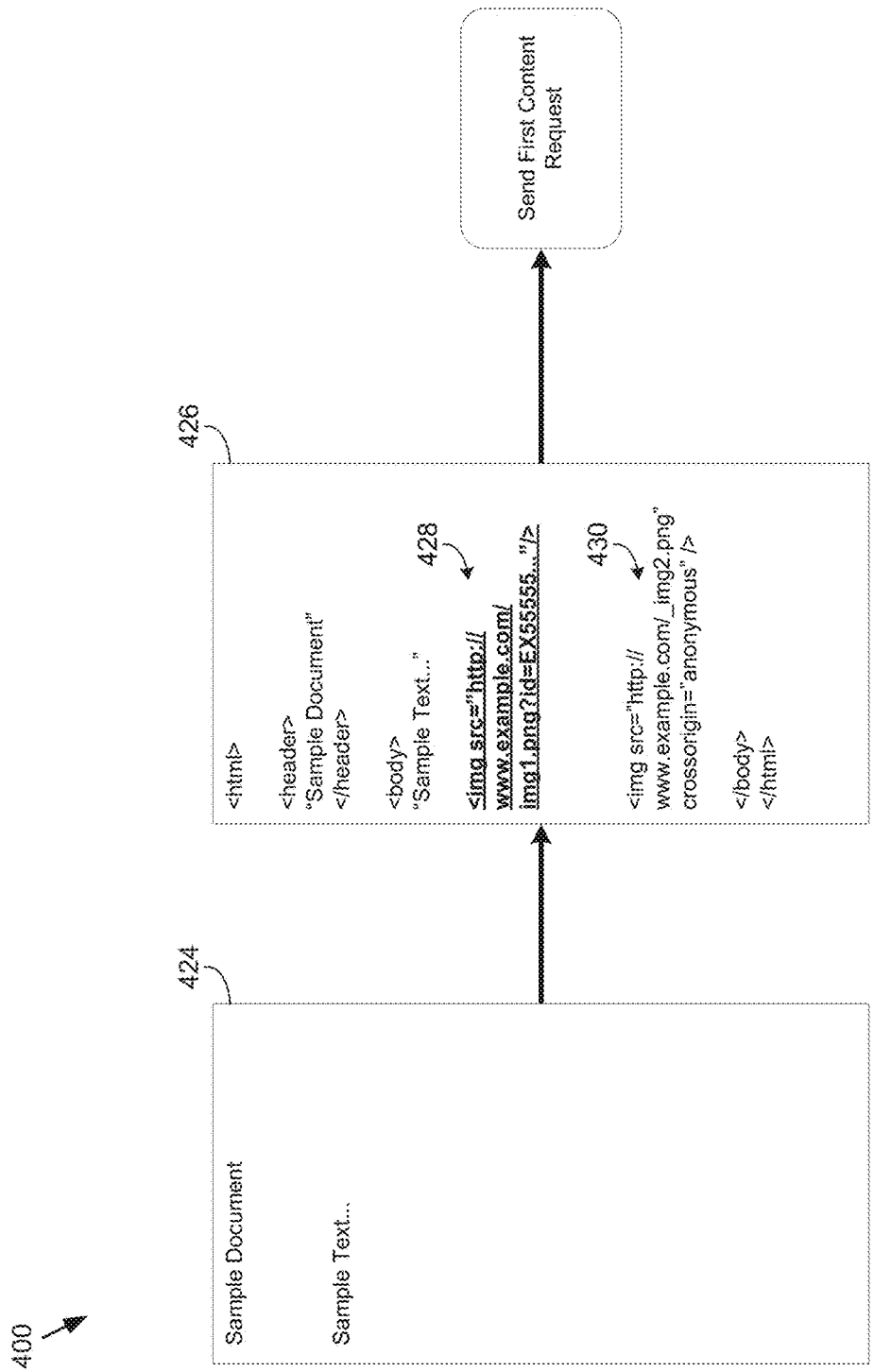
FIG. 4 is a diagram depicting a document and one or more content requests in accordance with the present disclosure.

Referring also to the example of FIG. 4, a user, (e.g., via a computing device) may receive and/or access the document with the embedded first and second content requests. For example, document 424 may include an email, a web page, mobile application, and/or other document capable of requesting content from outside the document with a plurality of content requests. In some embodiments, a user may open and/or access the document and the computing device may render the plurality of content requests. In some embodiments, the computing device may include a browser configured to render the plurality of content requests. For example, a user may receive an email and may open the email and/or user 48 may access web page 424. Upon opening and/or accessing document 424, the computing device may render the markup symbol or code of document (e.g., HyperText Markup Language (HTML) language extensible Markup Language (XML), Scribe, Standard Generalized Markup Language (SGML), Extensible HyperText Markup Language (XHTML), or any other markup language capable of structuring and presenting content on the World Wide Web) to display the contents of the document.

An example of the markup symbols or code of document 426 may include a first content request 428 and a second content request 430. In some embodiments, first content request 428 may be placed before or otherwise prioritized for rendering before second content request 430. In some embodiments, each of the first and second content requests may be sub-requests within the document. While a first and second content requests have been discussed, any number of content requests are within the scope of the present disclosure. For example, in some embodiments, user-tagging process 10 may include a plurality of content requests between first content request 428 and second content request 430. Upon rendering first content request 428 the computing device (e.g., requesting computing device) may send the first content request to another computing device, a domain, a server, a cloud-based storage location, a network, etc. As discussed above, one or more of the first and second content requests may include an HTML element or "tag" such as an image tag ("img"), an object tag ("object"), etc.

In some embodiments, user-tagging process 10 may receive 202 a first content request. As discussed above and in some embodiments, first content request 428 may be received from a requesting computing device in response to a user of the requesting computing device opening and/or accessing a document such as an email, mobile application, and/or web page including the first and second content requests. A requesting computing device, as used herein, may include but is not limited to a computing device configured to directly provide one or more content requests to computing device 12 (e.g., server 12), a computing device configured to indirectly provide one or more content requests to computing device 12 via one or more proxy computing devices and/or proxy servers, etc.

Referring again to FIG. 1 and in some embodiments, user 48 may access computing device 12 via computing device 40 connected to network 14. In one example, computing device 40 may directly provide first content request to computing device 12. As will be discussed in greater detail below, use-tagging process 10 may provide a response to first content request directly to computing device 40. In another example, computing device 40 may indirectly provide first content request 424 to computing device 12 via one or more proxy servers (not shown) within or associated with network 14. In this example, user-tagging process 10 may or may not identify computing device 40 and may provide a response to the first content request via the one or more proxy servers within or associated with network 14. While proxy servers have been discussed, one or more intermediate computing devices between a user's computing device and computing device 12 are within the scope of the present disclosure. As will be discussed in greater detail below, while computing device 40 may be separated from computing device 12 by one or more intermediate computing devices and/or proxy servers, user-tagging process 10 may provide a tag to computing device 40.

Referring again to the example of FIG. 4, first content request 428 may include at a first portion of data and a second portion of data. As will be discussed in greater detail below, the first portion of data from the first content request may include access-specific information and the second portion of data from the first content request may include a user-specific identifier or other user-specific information from which the user of a computing device may be identified.

In some embodiments, the first portion of data from the first content request may include, but is not limited to, access-specific information. Access-specific information, as used herein, may include but is not limited to information related to and/or associated with how the document is being accessed. In some embodiments, the access-specific information may be associated with the requesting computing device. In one example, user-tagging process 10 may receive first content request 428 directly from computing device 40. In this example, the access-specific information may include, but is not limited to, device information and/or identifier(s) associated with computing device 40 (e.g., such as Apple® Universal Device ID (UDID), Android® ID, Android® Advertising ID, Google® Advertising ID, identifierForVender (IDFV), identifierForAdvertising (IDFA), Windows® Advertising ID, a geolocation associated with the computing device, Media Access Control (MAC), etc.), an IP address of computing device 40, cookies, session values and/or session user-keys stored on computing device 40, a User Agent string, timing information (e.g., time when request was made), etc. In some embodiments, the access-specific information may be stored in one or more request headers. Additionally and/or alternatively, the access-specific information may be stored in any other consistent header that may vary per session or device.

As will be discussed in greater detail below, user-tagging process 10 may use access-specific information, such as one or more of the IP address of computing device 40, User Agent string of the first content request header, and timing information, to recognize a computing device associated with user 48.

In another example, user-tagging process 10 may receive first content request 428 indirectly from computing device 40 (e.g., via one or more proxy servers, proxy devices, or other intermediate computing devices). In this example, the access-specific information may include, but is not limited to, an IP address, a User Agent string of a request header, timing information (e.g., time when request was made), etc. As will be discussed in greater detail below, user-tagging process 10 may use one or more of the IP address, User Agent string of the first content request header, and timing information to recognize a computing device associated with user 48. In this example, because of one or more proxy servers and/or intermediate computing devices, user-tagging process 10 may or may not receive the IP address of computing device 40 but may receive the IP address of one or more of the proxy servers and/or intermediate computing devices. As will be discussed in greater detail below, user-tagging process 10 may use one or more of the IP address of the proxy servers and/or intermediate computing devices, User Agent string of the first content request header, and timing information to recognize a computing device (or combination of computing devices) associated with user 48. However and as will be discussed in greater detail below, user-tagging process 10 may still be able to provide a tag to user 48.

In some embodiments, the second portion of data from the first content request may include a user-specific identifier. As discussed above, a user-specific identifier may include any sequence of numbers, letters, symbols, combinations thereof, etc. specific to each individual. As discussed above and in some embodiments, the user-specific identifier may be pre-defined in one or more databases for one or more individuals in a target list. Referring again to the example of FIG. 4, first content request 428 may include the following example HTML image tag:

<img src="http://www.example.com/img1.png?id=EX55555&data=|| . . . ||"/>.

In the above example HTML image tag, first content request 428 may include a request for an image, "img1.png" referenced by the "EX55555" id value. In some embodiments, "EX55555" of the above HTML image tag may be a token or parameter included in the first content request. As discussed above, a user-specific identifier may be embedded into the first content request. In some embodiments, the first portion of data from the first content request may include the user-specific identifier previously embedded into the first content request.

Figure 5:
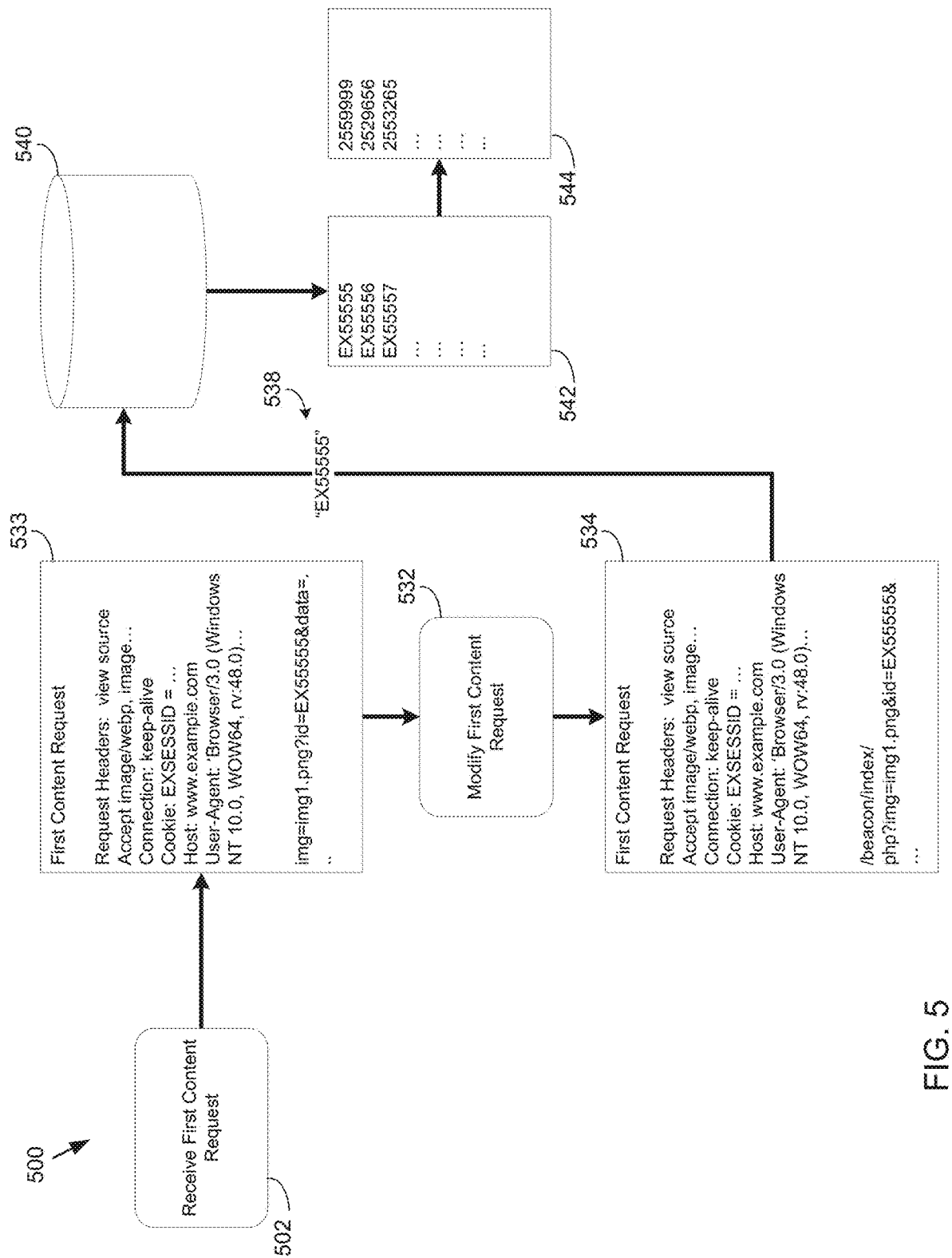
FIGS. 5-7 are diagrams depicting embodiments in accordance with the present disclosure.

Referring also to FIG. 5 and in some embodiments, user-tagging process 10 may modify 532 first content request 533 based upon, at least in part, a content item requested in the first content request. In some embodiments, user-tagging process 10 may include a Uniform Resource Locator (URL) rewrite engine (e.g., such as a mod_rewrite module of Apache® Webserver) with one or more pre-defined rules and may be configured to listen for a pre-defined request. In one example, user-tagging process 10 may listen for a content request for specific content such as "img1.png . . . " and may modify the first content request (e.g., via a URL re-write engine). For example, in the above HTML image tag of first content request 424, a requesting computing device may request an image called "img1.png" referenced by an "EX55555" id value. In response to receiving the first content request requesting "img1.png", user-tagging process 10 may modify the first content request as provided below:

http://www.example.com/index.php?img-img1&id=EX55555& . . . .

In this example, user-tagging process 10 may modify 532 the first content request by redirecting the first content request to execute a server-scripting language script or command. Examples of a server-scripting language include, but are not limited to, Hypertext Preprocessor (PHP), Server-side JavaScript®, ASP, Python, Ruby, SMX, etc. User-tagging process 10, via a server-scripting language script 534, may extract one or more portions of data from the first content request. In some embodiments, utilizing a server-scripting language may allow user-tagging process 10 to perform operations in response to a request from a requesting computing device that may not be included in the request visible to a user of the requesting computing device.

Figure 7:
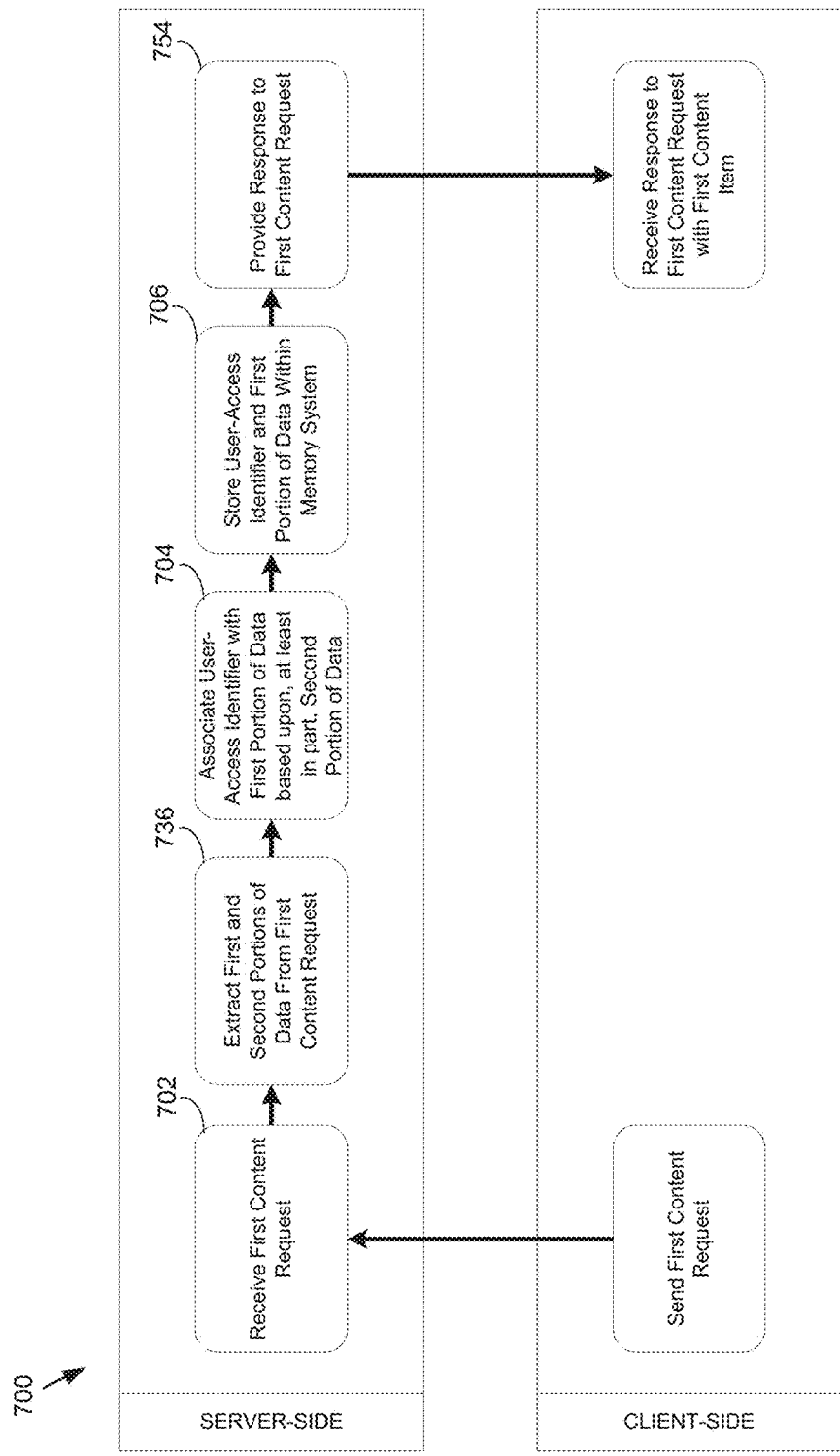

Referring also to FIG. 7 and in some embodiments, user-tagging process 10 may extract 736 the second portion of data 538 from the first content request. As discussed above and in some embodiments, the second portion of data 538 from the first content request may include a user-specific identifier. Referring again to the example of FIG. 5, user-tagging process 10 may extract the second portion of data including the user-specific information (e.g., "EX55555") from the first content request.

In some embodiments, a user-access identifier may be associated with a user-specific identifier in the database. As discussed above, each user-specific identifier may be associated with one or more user-access identifiers from database 540. In some embodiments, one or more databases (e.g., database 540) may include one or more tables or lists. In one example, database 540 may include a user-specific identifier list 542 and a user-access identifier list 544. In some embodiments, the user-specific identifier may be a "public key" which may be identifiable in document 424 by anyone with access to document 424 (e.g., "EX55555"). In some embodiments, user-access identifier may be a "private key" hidden from public inspection within user-access iden-tifier list 544 of database 540. In some embodiments, user-specific identifier and user-access identifier may be linked by a foreign key association. In some embodiments, each individual and/or user-specific identifier in the user-specific identifier list 542 may be associated with a user-access identifier in the user-access identifier list 544. In some embodiments, each user-access identifier in the user-access identifier list may include a status flag and/or value such as "0" or "1", where a status flag and/or value of "0" may indicate that the user-access identifier is inactive and/or unassigned and a status flag and/or value of "1" may indicate that the user-access identifier is active and/or assigned.

Figure 6:
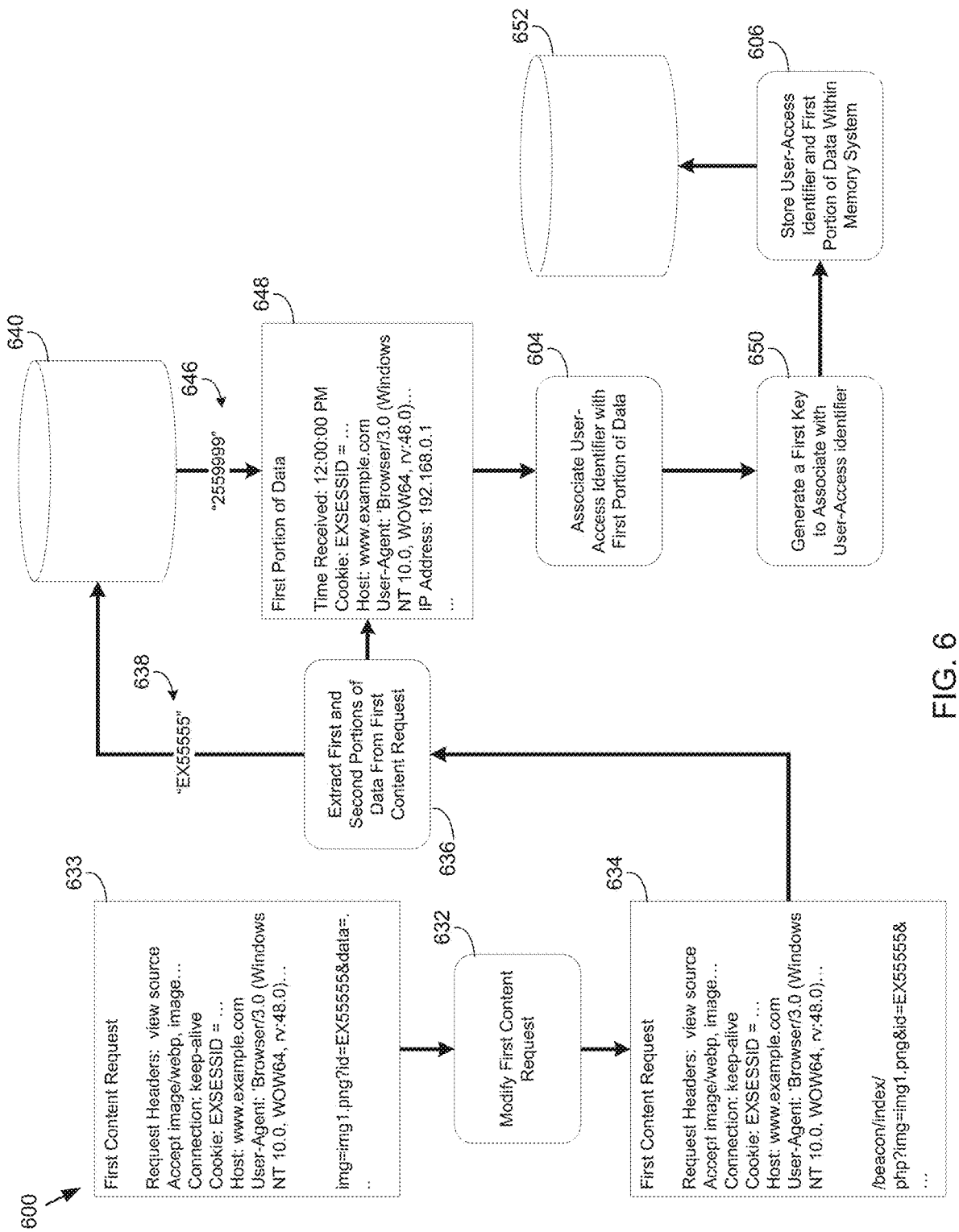

Referring also to FIG. 6 and in some embodiments, user-tagging process 10 may match the second portion of data to a user-specific identifier in the database. In one example, user-tagging process 10 may match a user-specific identifier extracted from the second portion of data 638 from the first content request with a user-specific identifier stored in the database. In this example, user-tagging process 10 may match "EX55555" extracted from the second portion of data from the first content request with "EX55555" stored in the user-specific identifier list 542 of database 540.

In some embodiments, user-tagging process 10 may include identifying the user-access identifier associated with the user-specific identifier from the database. In response to matching "EX55555" extracted from the second portion of data from the first content request with "EX55555" stored in the user-specific identifier list 540 of database 536, user-tagging process 10 may identify and/or query the user-access identifier list 542 for the user-access identifier associated with the user-specific identifier "EX55555". In the example of FIG. 5, user-tagging process 10 may identify user-access identifier "2559999" 646.

In some embodiments, user-tagging process 10 may include extracting 636 the first portion of data 648 from the first content request. As discussed above and in some embodiments, the first portion of data 648 from the first content request may include, but is not limited to, access-specific information such as an IP address, a User Agent string of the request header of the first content request, timing information (e.g., time when request was made), etc. In some embodiments, user-tagging process 10 may include extracting and storing other data (e.g., not included in the first and/or second portion of data). This data may be stored in one or more databases. Examples of other data that may be extracted and stored may include, but are not limited to, a timestamp, an email address, a profile ID, a logged ID, a tag_status, a user-identifier tag status, etc. As used herein, a "profile ID" may include, but is not limited to, a foreign key to a table configured to hold data associated with and/or identifying a requesting computing device. In some embodiments, the profile ID may be used to identify a computing device in future transactions. Examples may include, but are not limited to, font, operating system (e.g., OS), plugins enabled on the computing device, etc. In some embodiments, access-specific information may include the profile ID. As used herein, a "logged ID" may include, but is not limited to, the actual "ID" parameter as received. For example, some clients may send over unparsed tokens which may not be interpreted correctly. By receiving the logged ID, user-tagging process 10 may determine if a computing device is performing the tagging process incorrectly. "Tag_status" as used herein may include, but is not limited to, a flag with possible values of "0" or "1" where "1" may indicate that the tag information (e.g., ID and/or logged ID) was passed correctly and matched a record in a database. A value of "0" may indicate that user-tagging process 10 failed to match the user-identifier tag to a user-identifier tag within a database. In some embodiments, this may be due to a bad token or missing value. In some embodiments utilizing user-tagging process 10 within an email, the value of "0" may indicate if an email merge was incorrect. "User-identifier tag status" as used herein may include, but is not limited to, a flag with possible values of "0" or "1" where a value of "1" may indicate that user-tagging process 10 was able to drop a user-identifier tag successfully and that the user-identifier tag was successfully read from memory. A value of "0" may indicate that user-tagging process 10 failed to match a user-identifier tag because the user-identifier tag data was bad and/or because of a failure with reading the user-identifier tag from memory. While the above examples of specific items of data have been described, other information may be extracted from the first content request.

In some embodiments, user-tagging process 10 may include associating 204 a user-access identifier from a database with a first portion of data from the first content request based upon, at least in part, a second portion of the data from the first content request. As will be discussed in greater detail below, user-tagging process 10 may associate the user-access identifier 646 with the computing device associated with the first portion of data from first content request (e.g., access-specific information) to tag a user and/or a computing device associated with a user.

In some embodiments, user-tagging process 10 may include generating 650 a first key to associate with the user-access identifier based upon, at least in part, the first portion of data extracted from the first content request. In some embodiments, the first key may be generated based upon the access-specific information extracted from the first content request. In one example, the first key may be the access-specific information extracted from the first content request. In some embodiments, generating the first key to be associated with the user-access identifier may include creating a hash of some or all of the access-specific information. For example, user-tagging process 10 may use any hash function to generate the first key to associate with the user-access identifier based upon, at least in part, the first portion of data extracted from the first content request. In one example, generating the first key to be associated with the user-access identifier may include creating an MD5 hash of some or all of the access-specific information. An MD5 hash, as is known in the art, may include a 128-bit hash value generated from the MD5 algorithm. In another example, generating the first key to be associated with the user-access identifier may include creating an MD5 hash of the IP address and the User Agent string of the request header of the first content request. While a hash function has been described to generate the first key, any encryption or cryptographic algorithm, function, and/or technique may be used to generate a unique value to associate with the user-access identifier. In one example, user-tagging process 10 may use any computationally simple key-generation technique with a limited number of characters while simultaneously offering billions of permutations and low levels of collision.

In some embodiments, user-tagging process 10 may include storing 206 the first portion of data from the first content request and the user-access identifier within a memory system. In some embodiments, the first portion of data from the first content request and the user-access identifier may be stored in memory system 652. In some embodiments, memory system 652 may be within storage device 16 associated with computing device 12. In some embodiments, memory system 652 may be a distributed memory system across multiple servers and/or cloud-based storage locations. In some embodiments, memory system 652 may be a memory caching system distributed across one or more servers or other storage locations for storing chunks of arbitrary data (strings, objects, etc.) from results of database calls, API calls, and/or page rendering (e.g., such as Memcache and/or Memcached). In some embodiments, memory system 652 may include a key-value store where data may be stored in a memory system and may be accessed by an associated key value. While examples of memory system 652 have been discussed, any data storage location, hardware, software, application, etc. may be used for storing the first portion of data from the first content request and the user-access identifier and any such data storage location and/or storage system, hardware, software, application, etc. is within the scope of the present disclosure. In some embodiments, memory system 652 may be a server-side data store.

In some embodiments, the first portion of data from the first content request may be used as a key to query the user-access identifier in the memory system. Alternatively, the first key may be used as a key to query the user-access identifier in the memory system within the server and or one or more servers.

In some embodiments and as discussed above, user-tagging process 10 may include generating a first key based upon, at least in part, the first portion of data extracted from the first content request. In some embodiments, the first key may be a simple alphanumeric sequence or string unique to the access information associated with a requesting computing device. In these embodiments, user-tagging process 10 may store the first key and the user-access identifier within the memory system. As discussed above, the first key and the user-access identifier may be stored in any storage location.

As will be discussed in greater detail below, the first portion of data from the first content request and/or the user-access identifier may be stored in a memory system (e.g., memory system 652) for a predefined maximum period of time. Alternatively, the first key and the user-access identifier may be stored in the memory system within the server for a predefined maximum period of time. In some embodiments, user-tagging process 10 may initiate a timer when the user-access identifier is stored in the memory system. In one example, the time may be set to the predefined maximum period of time. In some embodiments and as will be discussed in greater detail below, if the user-access identifier is not retrieved and/or removed from the memory system by the end of the predefined maximum period of time, the user-access identifier may be removed from the memory system. Additionally and/or alternatively, user-tagging process 10 may determine whether the predefined maximum period of time has elapsed from the time the first content request was received based upon, at least in part, timing information associated with the first content request.

In some embodiments, the predefined period of time may be defined by the memory system or storage system as a default predefined maximum storage time and/or may be a user-defined predefined maximum period of time. In one example, the predefined maximum period of time may be thirty seconds or 30,000 milliseconds. In some embodiments, the predefined maximum period of time may be based upon, at least in part, a request timeout period associated with the requesting computing device and/or a browser associated with the requesting computing device. In some embodiments, the predefined maximum period of time may be at least five second or 5,000 milliseconds. However, any predefined maximum period of time or maximum storage period is within the scope of the present disclosure. In some embodiments, the first portion of data from the first content request and/or the user-access identifier may be stored in the memory system (e.g., memory system 652) for an unlimited period of time. In some embodiments, memory system 652 may not include a predefined maximum period of time.

In some embodiments, user-tagging process 10 may provide a response to the first content request. As discussed above, requesting computing device may send first content request for a first content item. Referring again to the example of FIG. 4, first content request 424 may include a request for an image. In this example, user-tagging process 10 may provide a one pixel image (e.g., "img1.png") from the server and/or one or more servers and echo back (e.g., from the server-scripting language) an image header (e.g., .png image headers) for the image "img1.png" requested in the first content request. In some embodiments, the requested content may be the same (e.g., "img1.png") for each first content request regardless of the second portion of data in the first content request. In some embodiments, user-tagging process 10 may not provide the first content item in response to the first content request.

In some embodiments, user-tagging process 10 may include receiving 208 a second content request. In some embodiments, the second content request may be received any time after the first content request. In one example, the second content request may be received at any time within 0 (e.g., nearly concurrent) to 30,000 milliseconds (30 seconds) after the first content request is received and/or after the user-tagging process 10 provides a response to the first content request. However, these exemplary times are for purposes of illustration, not of limitation. In some embodiments, the second content request may be received and processed (as discussed below) before the first portion of data and/or user-access identifier are removed from the memory system. In some embodiments, the second content request may be received before the first content request has finished (e.g., user-tagging process 10 has provided a response to the first content request). In such embodiments, user-tagging process 10 may include polling or looping over a specific amount of time to give the first content request time to finish before the second content request is received and/or processed.

As will be discussed in greater detail below, user-tagging process 10 may receive a second content request and provide a user-identifier tag in response to the second content request. In some embodiments utilizing user-tagging process 10, issues relative to other tracking methods such as cookies and/or beacons may be overcome. For example, many browsers and/or computing devices may block cookies and/or beacons. Additionally and as will be discussed in greater detail below, user-tagging process 10 may provide a user-identifier tag unique to each user but referenced by the same generic tag identifier. That is, a user-identifier tag may be generated and provided for user 48 for storage in the memory of computing device 40 but may be accessible or identifiable by user-tagging process 10 by searching for a generic tag identifier such as "img2.png" regardless of the user. In some embodiments, the user-identifier tag may be stored in a cache of computing device 40. In some embodiments, the user-identified tag may be stored in a browser cache, an image cache, or any other storage device associated with computing device 40. However, any storage mechanism or memory system associated with computing device 40 is within the scope of the present disclosure.

Otherwise, user-tagging process 10 may need to search the memory (e.g., cache, browser cache, image cache, etc.) of computing device 40 for a user-identifier tag referenced by a unique name against an array or list of each user-access identifier. In this example, searching the memory of computing device 40 may require more time than may be provided by a browser for such requests. For example, a browser may have a predefined request time limit and searching the memory of computing device 40 for the user-identifier tag may require more than the predefined request time limit. In one example, a browser may have a predefined request time limit of thirty seconds or 30,000 milliseconds for receiving a response to a request and searching the memory of computing device 40 for the user-identifier tag may require more than 30,000 milliseconds, thus causing the browser to time out of the request without identifying the user-identifier tag. Additionally, certain ad-blocking features may have an even lower time limit for such requests. However, the predefined request time limits of browsers and/or ad-blocking features are discussed for purposes of illustration, not of limitation. In some embodiments, user-tagging process 10 may use any amount of time for matching the user-identifier tag referenced by a unique name against an array or list of each user-access identifier.

In some embodiments and as will be discussed in greater detail below, the more time spent searching the memory of a computing device for a user-identifier tag, the longer it may take to identify a user associated with the user-identifier tag. As discussed above and in some examples, request time outs, ad-blocking features, and other time restraints may reduce the time a process (e.g., such as an embodiment of user-tagging process 10) has to access the user-identifier tag and identify the user associated with the user-identifier tag.

Figure 8:
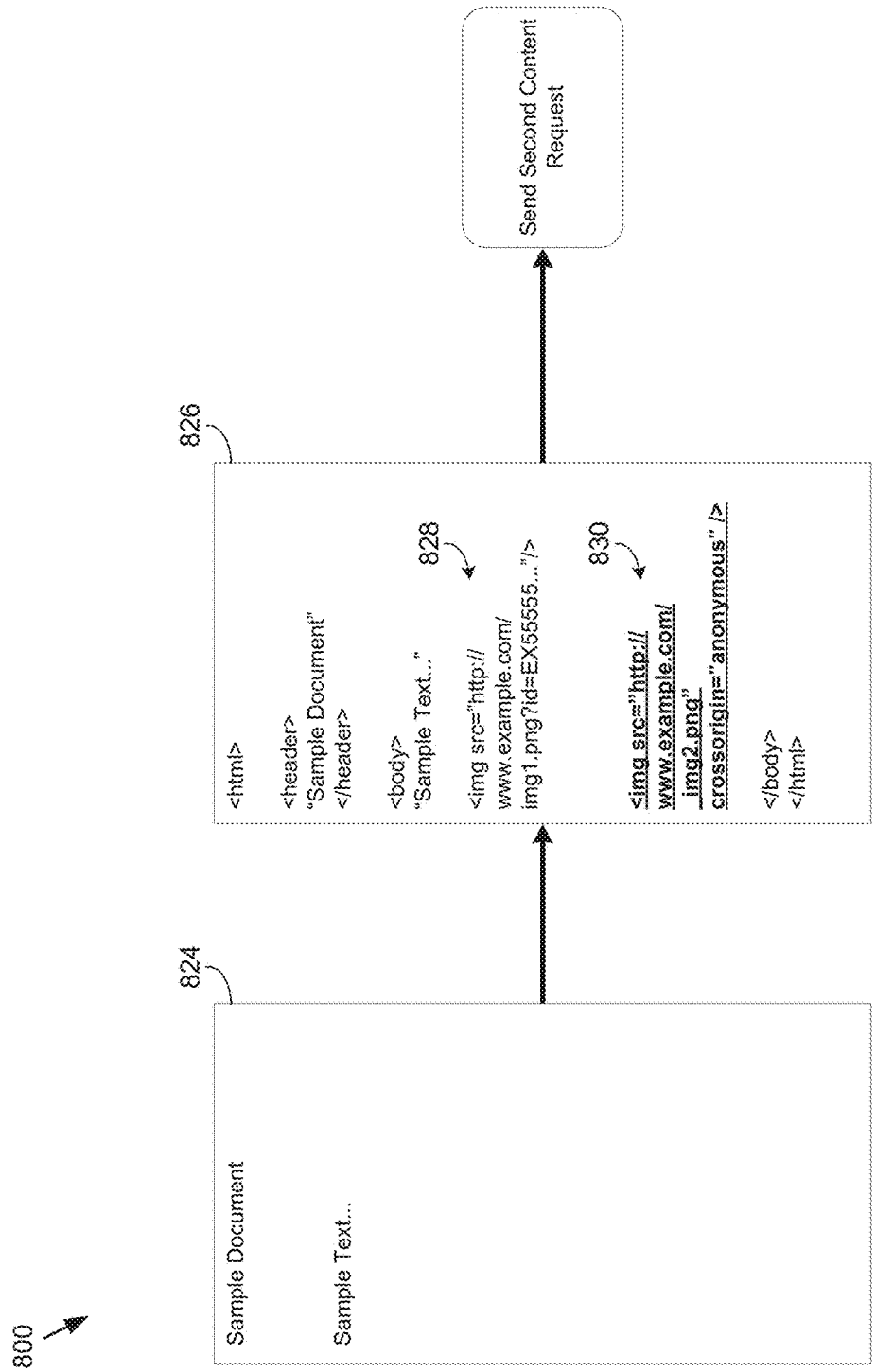
FIG. 8 is a diagram depicting a document and one or more content requests in accordance with the present disclosure.

Referring also to the example of FIG. 8, second content request 828 may include a first portion of data. As will be discussed in greater detail below, the first portion of data from the second content request may include access-specific information. In some embodiments, the second content request may identical for each user and/or may not include a user-specific identifier. In some embodiments, the second content request 828 may include the following example HTML image tag:

<img src="http://www.example.com/img2.png" crossorigin="anonymous">.

In the above example HTML image tag, second content request 830 may include a request for an image, "img2.png." In some embodiments, the tag may optionally include the portion of the tag "crossorigin='anonymous" which, in some embodiments, may be used to instruct the requesting computing device to receive the requested content into the memory (e.g., such as the cache) of the requesting computing device. However, as mentioned above, this is provided as an optional feature for purposes of illustration, not of limitation.

Figure 9:
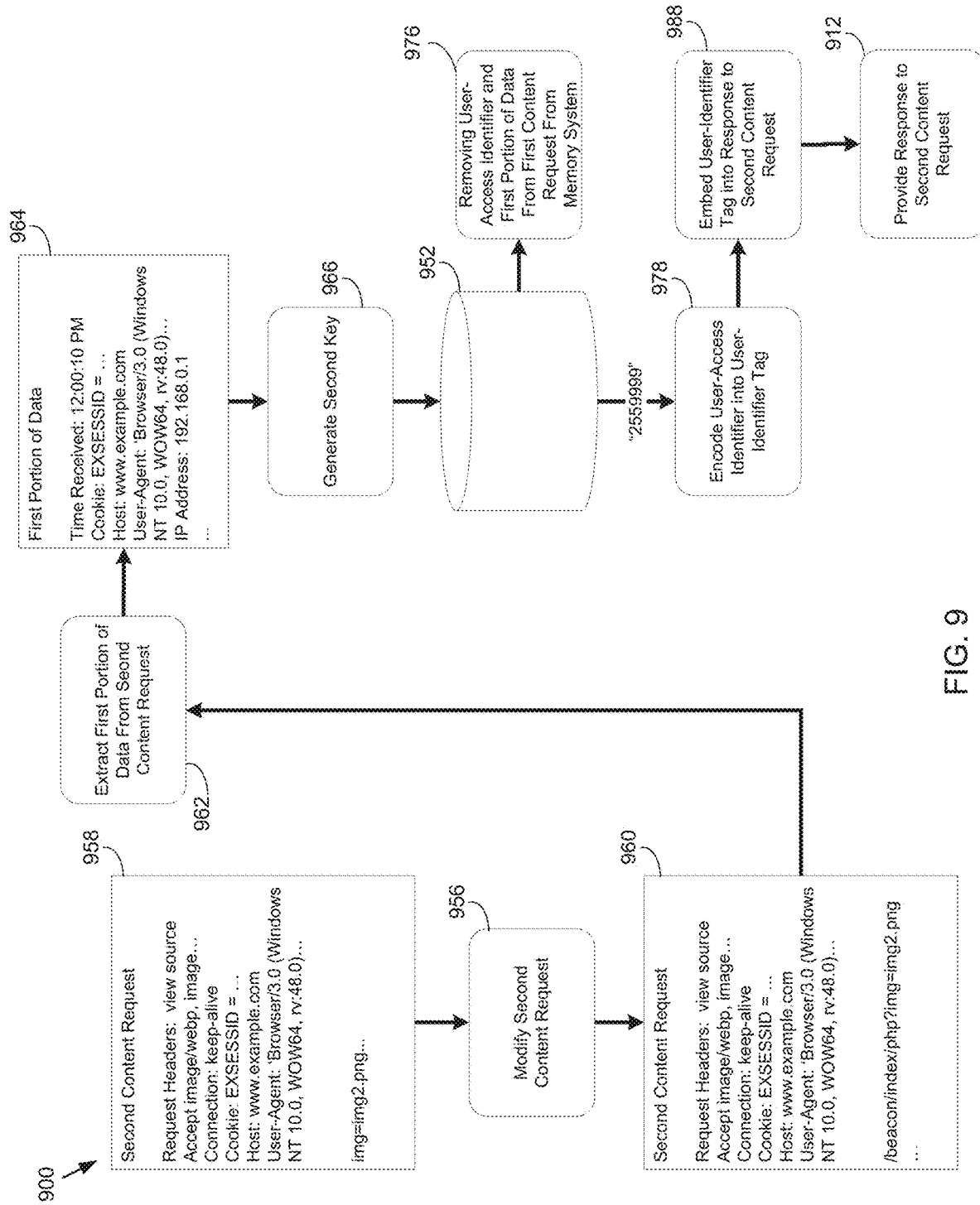
FIGS. 9-10 are diagrams depicting embodiments in accordance with the present disclosure.
Figure 10:
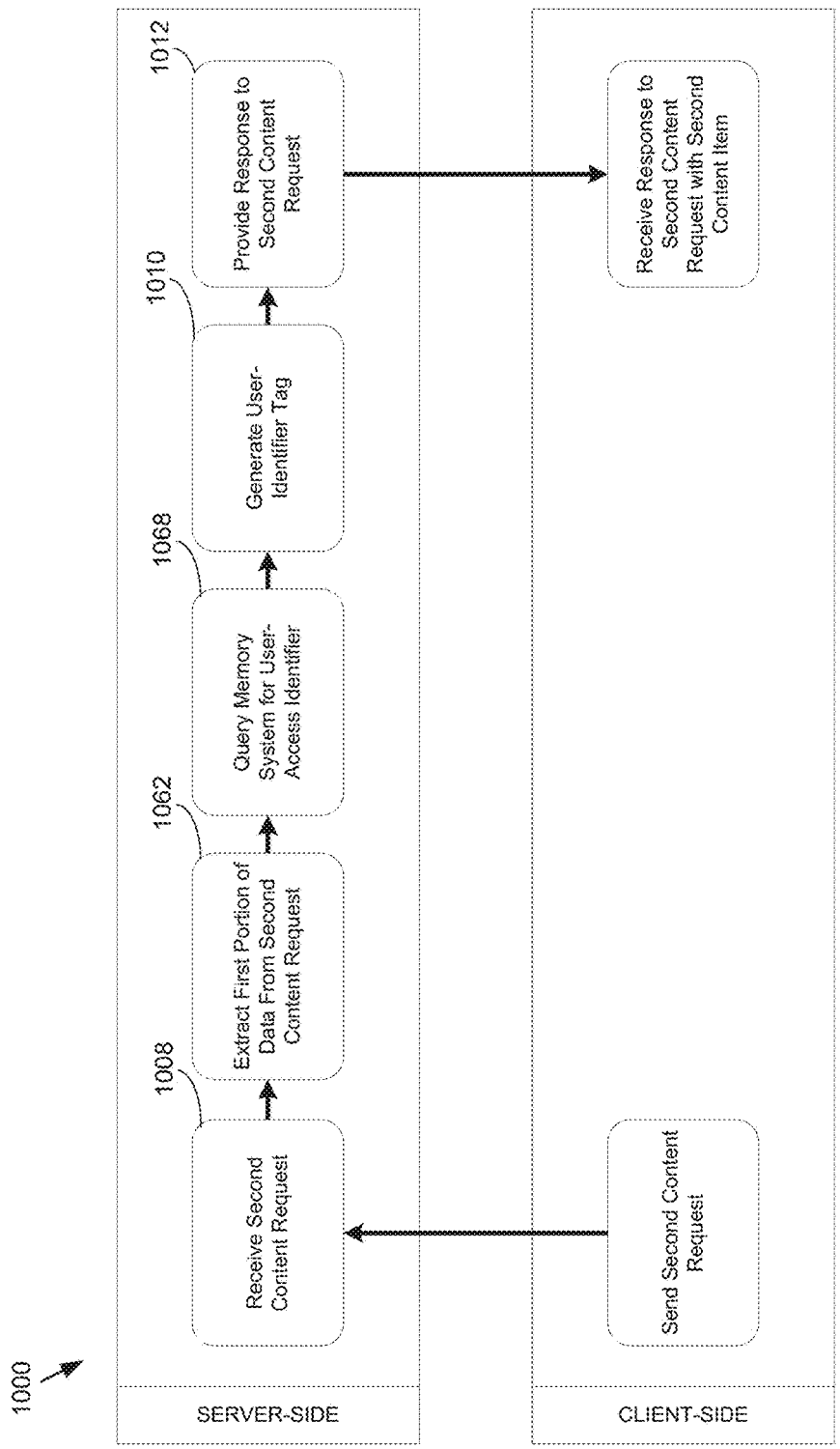

Referring also to FIGS. 9-10 and in some embodiments, user-tagging process 10 may modify 956 second content request 958 based upon, at least in part, a content item requested in the second content request. As discussed above and in some embodiments, user-tagging process 10 may include a Uniform Resource Locator (URL) rewrite engine (e.g., such as a mod_rewrite module of Apache® Webserver) with one or more pre-defined rules and may be configured to listen for a pre-defined request. In one example, user-tagging process 10 may listen for a content request for specific content such as "img2.png . . . " and may modify the second content request (e.g., via a URL re-write engine). For example, in the above HTML image tag of second content request 830, a requesting computing device may request an image called "img2.png". In response to receiving the second content request requesting "img2.png", user-tagging process 10 may modify the second content request as provided below:

http://www.example.com/index.php?route=/url-path&img=_img2& . . . .

In this example, user-tagging process 10 may modify 956 the second content request by redirecting the second content request to execute a server-scripting language script or command. As discussed above, examples of a server-scripting language may include, but are not limited to, Hypertext Preprocessor (PHP), Server-side JavaScript®, ASP, Python, Ruby, SMX, etc. User-tagging process 10, via a server-scripting language script 960, may extract one or more portions of data from the second content request. As discussed above relative to the first content request and in some embodiments, utilizing a server-scripting language may allow user-tagging process 10 to perform operations in response to a request from a requesting computing device that may not be included in the request visible to a user of the requesting computing device.

In some embodiments, user-tagging process 10 may include extracting 962 the first portion of data from the second content request. As discussed above and in some embodiments, the first portion of data 864 from the second content request may include, but is not limited to, access-specific information such as an IP address, a User Agent string of the request header of the first content request, timing information (e.g., time when request was made), etc. In some embodiments, user-tagging process 10 may include extracting and storing other data (e.g., not included in the first portion of data). This data may be stored in one or more databases.

In some embodiments, user-tagging process 10 may include generating 966 a second key based upon, at least in part, the first portion of data extracted from the second content request. In some embodiments, second key may be generated based upon the access-specific information extracted from the second content request. In one example, the second key may be the access-specific information extracted from the second content request. In some embodiments and as discussed above relative to generating the first key, generating the second key may include creating a hash of the access-specific information. In one example, generating the second key may include creating an MD5 hash of the access-specific information. While a hash function and an MD5 hash have been described to generate the second key, any encryption or cryptographic algorithm, function, and/or technique may be used to generate a unique value. In one example, user-tagging process 10 may use any computationally simple key-generation technique with a limited number of characters while simultaneously offering billions of permutations and low levels of collision. In some embodiments, user-tagging process 10 may use the same cryptographic technique to generate the second key as was used to generate the first key. In some embodiments, and as discussed above, the first portion of data from the first content request and the second content request may include access-specific information. In one example, the access-specific information associated with a computing device may be identical and/or may be similar across content requests. In this example, the first portion of data from the first content request may match the first portion of data from the second content request and may indicate that each content request was received from the same computing device. In some embodiments, user-tagging process 10 may use the same process (e.g., encrypting or not encrypting the first portion of data of each content request) to generate the second key as was used to generate the first key to determine whether the first and second content requests were received from the same computing device.

As will be discussed in greater detail below and in some embodiments, user-tagging process 10 may include generating 210 a user-identifier tag based upon, at least in part, the user-access identifier stored in the memory system, the first portion of data from the first content request, and a first portion of data from the second content request. A user-identifier tag, as used herein may include, but is not limited to a piece of data used to identify a user. As will be discussed in greater detail below, the user-identification tag may be a specific kind of content, such as a font, an image, etc. to make the user-identifier tag more resilient from anti-tagging and anti-tracking measures used within some browsers and/or computing devices. As will be discussed in greater detail below, the user-identifier tag may be stored in the memory of a computing device associated with a user and may be used to identify when the user (via the computing device) accesses content such as emails, mobile applications, web pages, etc. As discussed above, the memory of a computing device associated with a user may include, but is not limited to, a browser cache, an image cache, a local file system and/or any storage system associated with and or in communication with computing device 40. Additionally and/or alternatively, the user-identifier tag may be used to determine user-access habits or preferences observed while the user navigates content with the user-identifier tag saved in the memory of the computing device.

Referring also to FIGS. 9 and 10 and in some embodiments, user-tagging process 10 may search or query 1068 the memory system for a user-access identifier. In some embodiments, user-tagging process 10 may match the first portion of data from the second content request with a first portion of data stored in the memory system. In this example, user-tagging process 10 may match the first portion of data from the second content request with the first portion of data from the first content request stored in the memory system. As discussed above, in some embodiments, the first portion of data from the first content request and the user-access identifier may be stored within the memory system in a "key-value" format. In some embodiments, matching may include identifying an exact match and/or at least a partial match between at least two portions of data.

As discussed above and in some embodiments, the first portion of data from the first content request may act a key to access the user-access identifier stored within the memory system. In some embodiments, the first portion of data from the second content request may be compared against the "keys" within memory system 952. Alternatively, the first portion of data from the first content request and the user-access identifier may be stored within the memory system in a "key-value" format. In some embodiments, the first key generated from the first portion of data from the first content request may act as a key to access the user-access identifier stored within the memory system. In some embodiments, the second key generated from the first portion of data from the second content request may be compared against the "keys" within memory system 952.

In some embodiments, user-tagging process 10 may include identifying the user-access identifier from the database associated with the first portion of data extracted from the second content request. In response to matching the first portion of data from the second content request with the first portion of data from the first content request stored in memory system 952, user-tagging process 10 may identify and/or query the memory system for the user-access identifier associated with the first portion of data from the second content request. In the example of FIG. 9, user-tagging process 10 may identify user-access identifier "2559999" 946.

In some embodiments, a shorter period of time required to match the first portion of data from the first content request with the first portion of data from the second content request may increase the likelihood that the user may be identified. In some embodiments utilizing user-tagging process 10 and as discussed above, the time required to match the first portion of data from the first content request with the first portion of data from the second content request may be decreased and the likelihood that the user may be identified may be increased.

Figure 11:
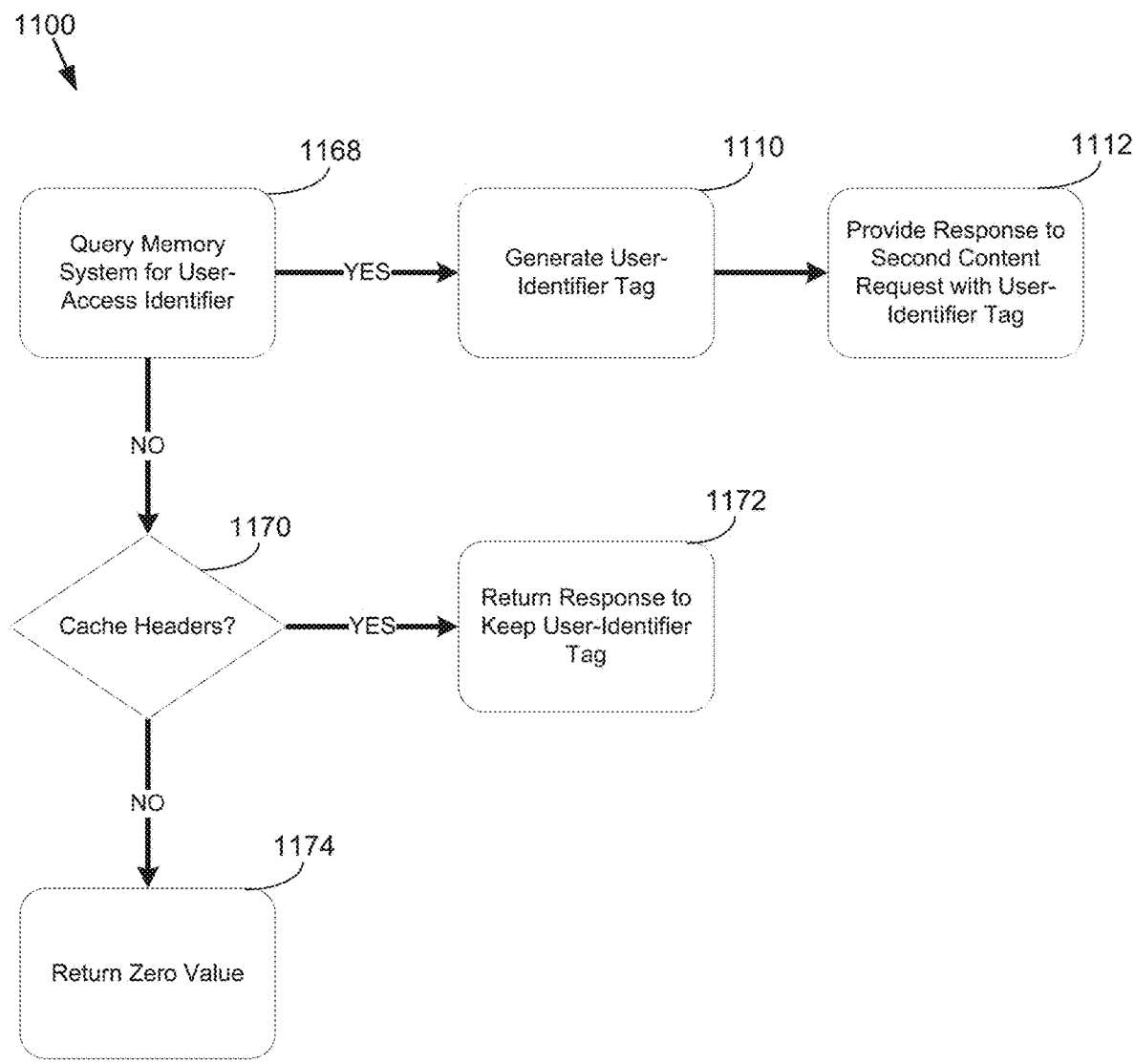
FIG. 11 is a flowchart depicting operations consistent with the user-tagging process in accordance with an embodiment of the present disclosure.

Referring also to FIG. 11 and in some embodiments, user-tagging process 10 may be unable to match the first portion of data from the second content request with the first portion of data from the first content request stored in the memory system. Alternatively, user-tagging process 10 may be unable to match the second key generated from the second content request with the first key generated from the first content request stored in the memory system. In this situation, user-tagging process 10 may determine if there are cache headers available from the second content request. As will be discussed in greater detail below, the presence of cache headers may be determined because the user-identifier tag may include a directive to revalidate (e.g., must-revalidate).

For example, if user-tagging process 10 is unable to provide a match with a first portion of data in the memory system (e.g., unsuccessful query of the memory system), the requesting computing device may not have sent a first content request. In this situation, user-tagging process 10 may determine if a user-identifier tag already exists in the memory of the requesting computing device. In one embodiment, user-tagging process 10 may determine 1170 if there are cache headers. In some embodiments, cache headers may be included with the second content request if a user-identifier tag is already on the device (e.g., computing device 40), and/or had been previously downloaded to the computing device from a prior tagging process. For example, suppose user 48 opens an email, is tagged with a user-identifier tag, and then re-opens the email or opens a second email containing the first and second content requests. As will be discussed in greater detail below, cache headers may be included in the second content request because the previously set user-identifier tag may include a directive to revalidate (e.g., must-revalidate). In this second opening of the email, when a second content request is sent, a browser of the computing device may send cache headers along with second content request as the directive to revalidate may have been previously set by the first email's tagging process.

In some embodiments, if user-tagging process 10 determines 1170 that there are cache headers available, user-tagging process 10 may return 1172 a response to the second content request directing the requesting computing device to keep the user-identifier tag as already stored in the memory of the requesting computing device. In one example involving HTTP, this may be an HTTP 304 response. Similar responses specific to other markup languages may be used and are within the scope of the present disclosure. If user-tagging process 10 determines that there are not cache headers available, user-tagging process 10 may return 1174 a content item with a zero value in response to the second content request. In this example, user-tagging process 10 still may provide a content item that is expected by the requesting computing device. The zero value may be the functional equivalent of not providing a content item while still satisfying the requesting computing device's expectation. As will be discussed in greater detail below, user-tagging process 10 may identify a user based upon, at least in part, the user-identifier tag stored in memory of the requesting computing device.

In some embodiments, user-tagging process 10 may include removing 976 one or more of the first portion of data and the user-access identifier from within the memory system when one or more of a pre-defined period of time lapses from the storing of the first portion of data from the first content request and the user-access identifier within the memory system and when the first portion of data from the second content request matches the first portion of data stored in the memory system. In some embodiments and as discussed above, the first portion of data and the user-access identifier may be stored temporarily in the memory system. In some embodiments, if a second content request is not received from the requesting computing device, the contents of the memory system may or may not be accessed by a requesting device with the same access information (e.g., first portion of data from second content request). In this example, the contents within the memory system would accumulate. In such cases, the memory system may be configured to remove the first portion of data and the user-access identifier from the memory system after a pre-defined maximum period of time (e.g., pre-defined period of time) and/or when a second content request includes a first portion of data that matches the first portion of data from the first content request stored within the memory system.

In some embodiments, user-tagging process 10 may initiate a timer when the user-access identifier is stored in the memory system. In one example, the time may be set to the predefined maximum period of time. In some embodiments, if the user-access identifier is not retrieved and/or removed from the memory system based upon, at least in part, the second content request by the end of the predefined maximum period of time, the user-access identifier may be removed from the memory system. In some embodiments and discussed in greater detail below, the first portion of data from the second content request may be used to match a first portion of data from a first content request in the memory system. Upon this matching, user-tagging process 10 may remove the first portion of data from the memory system. In some embodiments, if a matching is not completed by the end of the predefined maximum period of time, the user-access identifier may be removed from the memory system.

As discussed above, the predefined maximum period of time may be optionally applied and as such, the first portion of data and/or the user-access identifier may remain in memory system 952 until a match is found and/or until removed by a user and/or by some other memory system removal process.

Additionally and/or alternatively, user-tagging process 10 may determine whether the predefined maximum period of time has elapsed from the time the first content request was received based upon, at least in part, timing information associated with the first content request and the time the second content request was received based upon, at least in part, timing information associated with the first content request.

In some embodiments, the predefined maximum period of time may be may be defined by the server system or storage system as a default predefined maximum storage time and/or may be a user-defined predefined maximum period of time. In one example, the predefined maximum period of time may be thirty seconds or 30,000 milliseconds. In some embodiments, the predefined maximum period of time may be based upon, at least in part, a request timeout period associated with the requesting computing device and/or a browser associated with the requesting computing device. However, any predefined maximum period of time or maximum storage period is within the scope of the present disclosure. In some embodiments, there may not be a predefined maximum period of time or maximum storage period. In other words, the first portion of data and/or the user-access identifier may remain in memory system 952 until a match is found and/or until removed by a user and/or by some other memory system removal process.

In some embodiments, generating the user-identifier tag may include encoding 978 the user-access identifier into the user-identifier tag. As discussed above and in some embodiments, the user-access identifier may include a sequence of numbers, letters, symbols, combinations thereof, etc. that may identify how a user accesses a document including the document including the first and second content requests. In other words, the user-access identifier may be associated with a device and/or browser used by a user to access content on the Internet (e.g., first portion of data of first and/or second content requests). In some embodiments, the user-access identifier, as a sequence of numbers, letters, symbols, etc., may be encoded into a user-identifier tag that may be requested by and provided to a requesting computing device. As will be discussed in greater detail below, the user-identifier tag may be at least a portion of a content item requested by the second content request.

In some embodiments, the second content item requested by the second content request may not be an actual content item but may be a "tag" that is a reference to a content item. In some embodiments, user-tagging process 10 may encode the user-access identifier into the user-identifier tag and may embed the user-identifier tag into the second content item requested during the request (e.g., in "real-time"). As discussed above, the second content request may include a request for a font, an image, a text file, a video file, an audio file, or any other content item into which user-tagging process 10 may embed the user-identifier tag. For example and as will be discussed in greater detail below, the user-identifier tag may be at least a portion of the content item request by the second content request such that user-tagging process 10 may embed the user-identifier tag into the content item requested by the second content request. In some embodiments, the user-identifier tag may be embedded in a font, an image, a text file, a video file, an audio file, a "SWF" file (e.g., Shockwave Flash file), a "CSS" file (e.g. Cascading Style Sheet), a JavaScript® file, and/or in any file of any other file format.

As will be discussed in greater detail below and in one embodiment, the second content item or content item requested by the second content request may include one or more pixels or other form of data including color image data, such as an RGBA, CMYKA (cyan, magenta, yellow, black, alpha), or other color pixel or combination of pixels. In one embodiment, the user-identifier tag may be an RGBA pixel that includes the user-access identifier, for example, a seven digit integer. The user-identifier tag may also include a plurality of pixels, such as a plurality of pixels that are linked together so as to provide a larger number of user identification numbers. For example, a single pixel may represent approximately 18 million user identification numbers. By linking pixels together, the number of user-access identifiers increases from 18 million for one pixel to 324 trillion (18 million×18 million) with two pixels, and so on.

In some embodiments, user-tagging process 10 (at server 12) may associate an alpha value of A=127 for a pixel (e.g., user-identifier tag) such that the pixel will be invisible to the user but identifiable by a requesting computing device, such as computing device 40. Alternately, the alpha value can be any other number such that the pixel is visible, but the RGB coordinates can be similar to the surrounding images or otherwise blend in with the surrounding images so as to be camouflage to the user. In some embodiments, the pixel may not be visible to the user because the pixel may be subject to an HTML styling tag that may hide the pixel. Any other manner of creating the user-identifier tag may be implemented without departing from the scope of the present disclosure.

For example, the RGB or other color coordinate values may act as parts of the user-access identifier. For example, user-tagging process 10 may generate and/or modify the second content item requested by the second content request to include RGB coordinates having a value from zero to 2,559,999 (e.g., in the example of a single pixel, whereas multiple pixels may include one or more additional RGB coordinates). In this manner, the entire value associated with the first R value may act as the first three numbers of the user identification number, and the second two values associated with the G an B values may be the next digits of the user-access identifier. For example, in the case of a user-access identifier of 2,559,999, the RGB values may be R=255, G=99 or 199, and B=99 or 199. In some embodiments, user-tagging process 10 may encode the user-access identifier into two or more pixels. That is, user-identifier tag may include two or more pixels. In this example, the pixel may be associated with user-access identifier of up to 2,559,999,999,999 with pixel 1 having values of R=255, G=99 or 199, and B=99 or 199; and pixel 2 having values of R=99 or 199, G=99 or 199, and B=99 or 199.

Figure 12:
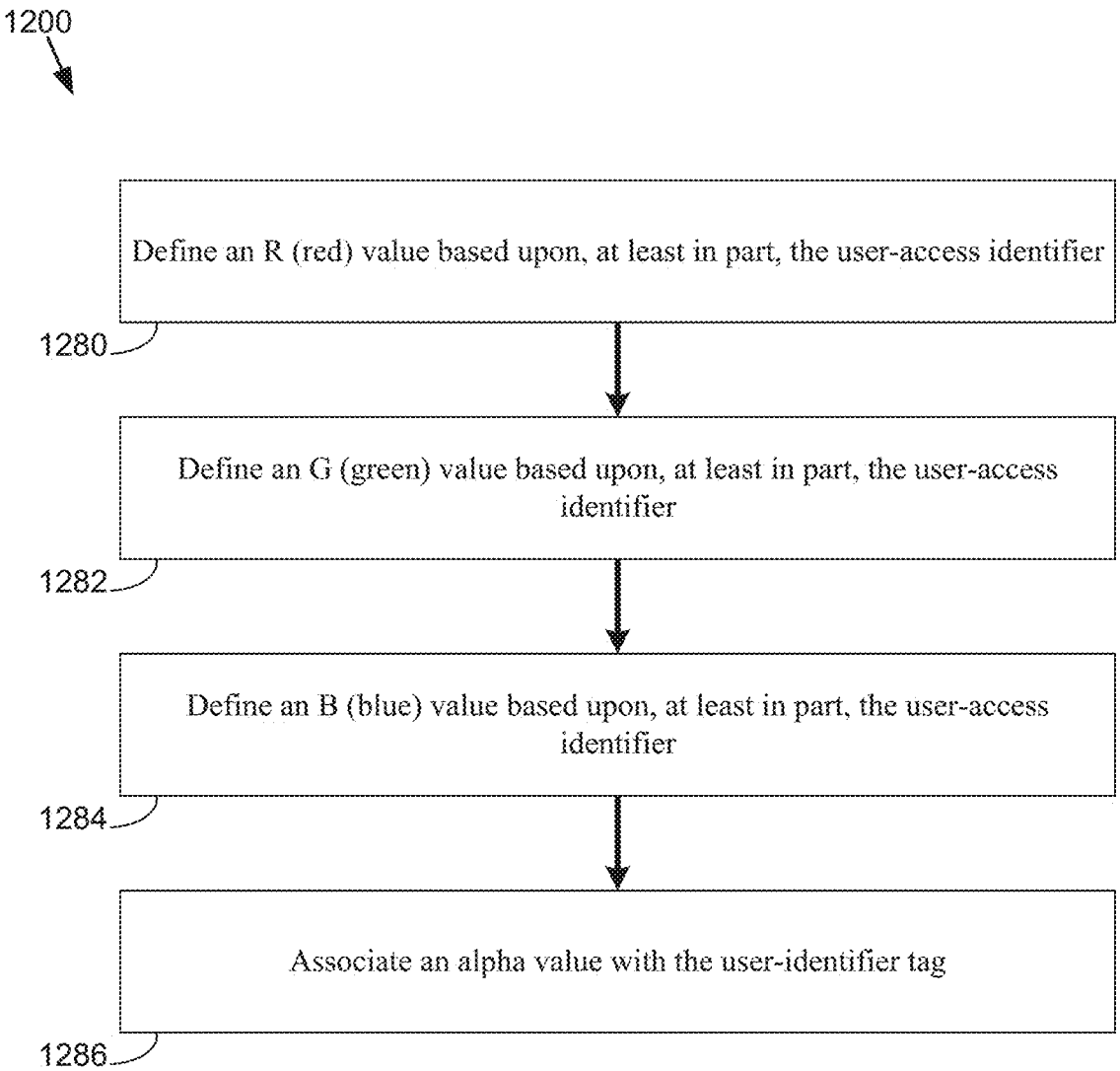
FIG. 12 is a diagram depicting an embodiment of generating a user-identifier tag in accordance with the present disclosure.

Referring also to FIG. 12 and as discussed above and in some embodiments, user-tagging process 10 may encode the user-access identifier into the user-identifier tag. For example, user-tagging process 10 may define 1280 an R value associated with the red color of the pixel based upon, at least in part, the user-access identifier. In this example, user-tagging process 10 may select an R value between 0-255 corresponding to one or more values of user-access identifier. For example, the R value may be "255" User-tagging process 10 may define 1282 a G value associated with the green color of the pixel based upon, at least in part, the user-access identifier. In this example, user-tagging process 10 may select a G value, also between 0-255 corresponding to one or more values of user-access identifier. For example, the G value may be "99". Similarly, user-tagging process 10 may define 1284 a B value associated with the blue color based upon, at least in part, the user-access identifier. In this example, user-tagging process 10 may selected a B value between 0-255 corresponding to one or more values of user-access identifier. For example, the B value may be "199". In some embodiments, user-tagging process 10 may optionally associate 1286 an alpha or A value of 127 with the pixel, so as to make the pixel invisible to the user of computing device 40 but visible to a computer device reading the memory (e.g., storage device 32) of computing device 40. In some embodiments, reading the memory of computing device 40 may include reading a browser cache, an image cache, and/or any storage system associated with computing device 40. Alternately, the alpha or A value may be any other value, and the pixel can blend in with its surroundings. In some embodiments, the alpha or A value may be any value, and HTML styling tags can be used to hide the pixel.

As discussed herein, the color scheme associated with the pixel can be the RGB system. However, any color system can be employed without departing from the spirit and scope of the present application, for example, RGB, CMYK, or any others. Further, the user-identifier tag need not be a single pixel, but can be a combination of pixels or any other form of data or content. Additional details regarding encoding a user identification number into a user identification tag are described, for example, in United States Patent Application Publication No. US2017/0068690 entitled "User Identification and Tracking System" and is incorporated by reference in its entirety herein.

In some embodiments, user-tagging process 10 may include embedding 988 the user-identifier tag into the response to the second content request. As discussed above, the second content request may include a request for content, such as "img2.png". User-tagging process 10 may provide the user-identifier tag as the content item requested by the second content request. In this example, user-tagging process 10 may embed or otherwise include the user-identifier tag in the response to the second content request. As will be discussed in greater detail below and in some embodiments, the user-identifier tag may include and/or be referenced by a generic tag identifier common to each user-identifier tag. In one example, each user-identifier tag may be referenced by the name and/or file name, such as "img2.png."

In some embodiments, user-tagging process 10 may include providing 212 a response to the second content request, the response including the user-identifier tag. In some embodiments, user-tagging process 10 may provide the user-identifier tag from the server and/or one or more servers and echo back (e.g., from the server-scripting language) a content-specific header (e.g., .png image headers for an image) for the content item "img2.png" requested in the second content request. As discussed above, the user-access identifier may be encoded into the image. As will be discussed in greater detail below, the user-identifier tag may include and/or be referenced by a generic tag identifier. While an image has been discussed, any content item may be used as the user-identifier tag and the user-access identifier may be encoded into the content item.

In some embodiments, the user-identified tag provided in the response to the second content request may include a directive configured to revalidate the user-identifier tag within the memory of the requesting computing device. In some embodiments, user-tagging process 10 may include one or more directives for the user-identifier tag within the responses headers of the response to the second content request. In some embodiments, the one or more directives may specify no age-limit for the user-identifier tag and a directive to revalidate the user-identifier tag when the user-identifier tag is accessed. In one example, the user-identifier tag may be stored in a cache of the requesting computing device (e.g., device used by a user to access the document including the first and second content requests). In this example, user-tagging process 10 may return, in the response header of the response to the second content request, a directive which may specify no age-limit the cached content. An example of the one or more directives may be found below.

"Cache-Control:No-Transform, Max-Age=0, Must-Revalidate"

The term "must-revalidate" is a specific example of a directive configured to instruct the requesting computing device and/or cache of the requesting computing device to verify the status of the stale resources before using them. For example, such a directive may instruct the computing device each time it reads the user-identifier tag to verify the status of the user-identifier tag with user-tagging process 10 (e.g., server 12) and user-tagging process 10 may return a response, such as a HTTP 304 response, for each read scenario.

In some embodiments, the directive "no-transform" may represent any directive configured to instruct the requesting computing device and/or cache of the requesting computing device (and/or proxies) to never transform the user-identifier tag for optimization purposes.

As discussed above and in some embodiments, the user-identified tag provided in the response to the second content request may include one or more cache headers. In one example, the one or more cache headers may include, but are not limited to, "Last-Modified" and "ETag". In some embodiments, a browser associated with the computing device with the user-identifier tag may keep this information with the user-identifier tag for the lifetime of its presence within cache.

In some embodiments, when the user-identifier tag is requested (e.g., by user-tagging process 10), the browser may see the user-identifier tag in the memory of the computing device (e.g., a cache, for example). In some embodiments and as discussed above, the browser may be instructed to revalidate (e.g., must-revalidate) the user-identifier tag by sending a request back to computing device 12 with one or more request headers based on the values of the response headers listed above. In one example where the cache header includes "Last-Modified", the cache header may return in the form "HTTP_IF_MODIFIED_SINCE" header. In one example where the cache header include "E-Tag", the cache header may return in the request in the form "HTTP_IF_NONE_MATCH". In some embodiments, when user-tagging process 10 receives the one or more headers, user-tagging process 10 may determine that the user-identifier tag is already stored in memory of the computing device (e.g., cached) and may return a status header instructing the browser to use what it currently has in memory.

Additional exemplary directives may include, but are not limited to, "Pragma: private" and/or "Expires: −1." However, user-tagging process 10 may include any number of directives.

In some embodiments, user-tagging process 10 may identify users based upon, at least in part, the user-identifier tag. In some embodiments, user-tagging process 10 may determine whether the user has a user-identifier tag stored within the memory of requesting computing device (e.g., in image cache at the computing device by reading the image cache of the computing device for an image user-identifier tag) and searching for a user-identifier tag. In some embodiments, each user-identifier tag may be stored as and/or embedded in the same content item (e.g., with unique user-access information encoded within the content item) and may be identified by a generic tag identifier. For example, the generic tag identifier can be the common name given to each user-identifier tags (e.g., pixels, text files, etc.) created in real-time, as discussed above. Alternately, or in addition to the above, the generic tag identifier may be any RGBA pixel with an A value of 127 (i.e., a transparent pixel or pixel otherwise invisible to the user), or some other component that is the same for all pixels or content items used. In so doing, the user-tagging process 10 may search for user-identifier tags of different users by implementing the same process—for example, searching for the generic tag identifier. In some embodiments, and as discussed above, a generic tag identifier may allow the user-identifier tag associated with any individual to be identified in the memory of the computing device by searching for the same generic tag identifier. This searching may be performed with JavaScript® web language or any other similar method. Any other manner of searching for users may be implemented without departing from the spirit and scope of the present application.

In some embodiments, user-tagging process 10 can identify the user, for example, by determining the user-access identifier associated with the user. In some embodiments, user-tagging process 10 may determine the user by associating the RGB components of the user-identifier tag with the user-access identifier associated with the user. For example and in the case of a pixel user-identifier tag, the pixel may be converted to an HTML canvas element and a script can extract the RGBA or other identifying data from the pixel to determine the user-access identifier. In some embodiments, the script can extract the data in a predetermined sequence to obtain the user-access identifier. The user-access identifier and any other data (for example, which website was visited) may then be transmitted via AJAX request or via any other method for data entry. As discussed above, user-tagging process 10 may query the one or more databases and/or user-access identifier list to identify a user.

In some embodiments, user-tagging process 10 may set one or more digits of the user-identifier tag (e.g., during encoding of the user-access identifier into the user-identifier tag) to a particular value (e.g., such a zero) where the checksum value of those one or more digits may always be the same. For example, user-tagging process 10 may encode a user-access identifier into a user-identifier tag as a RGB value. In this example, user-tagging process 10 may select one or more digits of the user-identifier tag (e.g., one or more RGB values or bits) and set them to a specific value (e.g., zero) such that upon identifying the user-identifier tag, a checksum may be performed on the one or more digits to determine if any of the digits have changed. If any of the digits have changed, the user-identifier tag may be ignored as it may have been manipulated or corrupted. If none of the digits have changed, the user-identifier tag may be read and may be used to identify the user.

As discussed above, a user who opens and/or accesses document 424 including the first and second content requests may receive a user-identifier tag for tracking the user. In so doing, the user's preferences, interests, shopping behavior, purchase behavior, web traffic behavior, and other characteristics may be tracked. In one embodiment, the user-identifier tag may be stored in image cache, which may be deleted less often than cookies or other forms of cache, and accordingly, the user may be tracked for a longer period of time relative to these storage methods.

In some embodiments, user-tagging process 10 may be used to tag a user despite a browser or computing device blocking certain browser functionality. In one example, a webpage may block iFrames, cookies, and/or may limit general browser functionality. In this event, user-tagging process 10 may provide a user-identifier tag, as discussed above, within the browser's HTML, which may effectively "tag" the individual in the same manner as if they had opened an email containing the first and second content requests as discussed above.

In another example where email images or other content items may be disabled, user-tagging process 10 may include a redirect (within the document) which may redirect a user to a webpage containing the first and second content items. When the browser renders the images, the user may be tagged in the same manner as if the user had opened the email with images enabled.

In some embodiments of user-tagging process 10, multiple devices and/or browsers associated with a user may be tagged. For example, user 48 may have a user-identifier of "EX55555" and a user-access identifier of "2559999". In one example, when user 48 accesses document 424, user-tagging process 10 may identify a user-identifier "EX55555" from the first content request within the document and associate a user-access identifier "2559999" with the computing device from which the first content request was made. In some embodiments, the requesting computing device, or device from which the first content request was made, may be the device and/or browser used by user 48 to access the document. As such, user-tagging process 10 may tag the requesting computing device with a tag that identifies user 48.

In some embodiments, a user-access tag may be associated with a computing device and/or browser used by user 48 to access document 424. In one example, user 48 may use a different or second computing device to access document 424. User-tagging process 10 may extract the second portion of data (e.g., for example, user-specific identifier) from the first content request from the second computing device. In this example, user-tagging process 10 may identify the same user-access identifier in database 538 and may tag the second computing device with the same user-identifier tag despite user 48 accessing document 424 from a different computing device.

In some embodiments, user-tagging process 10 may determine that one or more user-identifier tags have been provided in error. For example, suppose user 48 receives an email including first and second content requests and forwards that email to fifty (e.g., or any number) email contacts. Upon each of the fifty contacts opening the email, the same second portion of data from the first content request may be used to associate one or more user-access identifiers with multiple first portions of data unique to each requesting computing device. In this example, user-tagging process 10 may create fifty invalid user-identifier tags as the user-identifier tags generated for each of the fifty email contacts. In some embodiments, user-tagging process 10 may invalidate the one or more user-identifier tags generated without invalidating the user-specific identifier associated with the original email recipient. In some embodiments and as discussed above, user-tagging process 10 may invalidate the user-access identifier associated with the user-identifier tag in the user-access identifier list via one or more status flags or indicators (e.g., status flag set to "0" to invalidate).

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:
1. A computer-implemented method comprising:
receiving, using at least one processor, a first image request included in a web page document that includes the first image request and a second image request in the same web page;

associating a user-access identifier from a database with a first portion of data from the first image request based upon, at least in part, a second portion of the data from the first image request;

storing the first portion of data from the first image request and the user-access identifier within a memory system;

receiving the second image request included in the web page;

generating a user-identifier tag based upon, at least in part, the user-access identifier stored in the memory system, the first portion of data from the first image request, and a first portion of data from the second image request; and providing a response to the second image request, the response including the user-identifier tag.

2. The computer-implemented method of claim 1, wherein the user-identifier tag is generated based upon, at least in part, the user-access identifier when the first portion of data from the second image request matches the first portion of data stored in the memory system.

3. The computer-implemented method of claim 2, further comprising:

removing one or more of the first portion of data and the user-access identifier from within the memory system when one or more of a pre-defined period of time lapses from the storing of the first portion of data from the first image request and the user-access identifier within the memory system and when the first portion of data from the second image request matches the first portion of data stored in the memory system.

4. The computer-implemented method of claim 1, wherein the user-access identifier is associated with a user-specific identifier in the database.

5. The computer-implemented method of claim 4, further comprising:

extracting the second portion of data from the first image request;

matching the second portion of data to a user-specific identifier in the database; and identifying the user-access identifier associated with the user-specific identifier from the database.

6. The computer-implemented method of claim 1, further comprising:

extracting the first portion of data from the first image request;

generating a first key to associate with the user-access identifier based upon, at least in part, the first portion of data extracted from the first image request; and storing the first key and the user-access identifier within the memory system.

7. The computer-implemented method of claim 6, further comprising:

extracting the first portion of data from the second image request; and generating a second key based upon, at least in part, the first portion of data extracted from the second image request.

8. The computer-implemented method of claim 7, wherein the user-identifier tag is generated when the second key matches the first key stored within the memory system.

9. The computer-implemented method of claim 7, wherein each of the first and second keys are an MD5 hash of the first portion of data extracted from each of the first and second image requests.

10. The computer-implemented method of claim 1, further comprising:

encoding the user-access identifier into the user-identifier tag, wherein the user-identifier tag is a content item requested by the second image request; and embedding the content item into the response to the second image request.

11. The computer-implemented method of claim 1, wherein providing the response to the second image request includes sending the response to the second image request to a requesting computing device for storage in a memory of the requesting computing device.

12. The computer-implemented method of claim 11, wherein the user-identified tag provided in the response to the second image request includes a directive configured to revalidate the user-identifier tag within storage of the requesting computing device.

13. The computer-implemented method of claim 1, wherein a user-specific identifier is associated with each individual listed in a target list.

14. The computer-implemented method of claim 1, wherein the first portion of data from each of the first and second image requests includes access-specific information.

15. The computer-implemented method of claim 14, wherein the access-specific information includes one or more of an IP address of the requesting computing device, a User Agent string of a request header, and timing information.

16. The computer-implemented method of claim 1, wherein one or more of the first and second image requests includes a request for one or more of a font, an image, a text file, a video file, or an audio file.

17. The computer-implemented method of claim 1, wherein the user-identifier tag generated for each second image request includes a generic tag identifier common to each user-identifier tag.

18. The computer-implemented method of claim 1, wherein content rendered in response to the first image request and the second image request are both rendered within the web page.

19. The computer-implemented method of claim 1, wherein the user-identifier tag comprises an image or a pixel.

20. A computing system comprising:

a processor and a memory module coupled with the processor, the processor being configured for:

receiving a first image request included in a web page that includes the first image request and a second image request in the same web page;

associating a user-access identifier from a database with a first portion of data from the first image request based upon, at least in part, a second portion of the data from the first image request;

storing the first portion of data from the first image request and the user-access identifier within a memory system;

receiving the second image request included in the web page;

generating a user-identifier tag based upon, at least in part, the user-access identifier stored in the memory system, the first portion of data from the first image request, and a first portion of data from the second image request; and providing a response to the second image request, the response including the user-identifier tag.

21. A computer program product comprising a non-transitory computer readable storage medium having a plurality of instructions stored thereon, which, when executed by a processor, cause the processor to perform operations including:
- receiving a first image request included in a web page that includes the first image request and a second image request in the same web page;
- associating a user-access identifier from a database with a first portion of data from the first image request based upon, at least in part, a second portion of the data from the first image request;
- storing the first portion of data from the first image request and the user-access identifier within a memory system;
- receiving the second image request included in the web page;
- generating a user-identifier tag based upon, at least in part, the user-access identifier stored in the memory system, the first portion of data from the first image request, and a first portion of data from the second image request; and
- providing a response to the second image request, the response including the user-identifier tag.

\* \* \* \* \*

UNITED STATES PATENT AND TRADEMARK OFFICE
CERTIFICATE OF CORRECTION

| | | |
|---|---|---|
| PATENT NO. | : 12,107,931 B2 | Page 1 of 1 |
| APPLICATION NO. | : 17/354113 | |
| DATED | : October 1, 2024 | |
| INVENTOR(S) | : John Phillip Harlamert, II | |

It is certified that error appears in the above-identified patent and that said Letters Patent is hereby corrected as shown below:

In the Claims

Column 28, Line 65, Claim 1, after "page" delete "document".

Signed and Sealed this
Eleventh Day of February, 2025

Coke Morgan Stewart
*Acting Director of the United States Patent and Trademark Office*